(12) United States Patent
Moore et al.

(10) Patent No.: US 10,429,847 B2
(45) Date of Patent: Oct. 1, 2019

(54) DYNAMIC WINDOW APPROACH USING OPTIMAL RECIPROCAL COLLISION AVOIDANCE COST-CRITIC

(71) Applicant: Locus Robotics Corp., Wilmington, MA (US)

(72) Inventors: Thomas Moore, Edinburgh (GB); Bradley Powers, Lowell, MA (US)

(73) Assignee: Locus Robotics Corp., Wilmington, MA (US)

( * ) Notice: Subject to any disclaimer, the term of this patent is extended or adjusted under 35 U.S.C. 154(b) by 191 days.

(21) Appl. No.: 15/712,256

(22) Filed: Sep. 22, 2017

(65) Prior Publication Data

US 2019/0094866 A1    Mar. 28, 2019

(51) Int. Cl.
| | |
|---|---|
| *G05B 19/04* | (2006.01) |
| *G05D 1/02* | (2006.01) |
| *B60W 30/08* | (2012.01) |
| *G01C 21/20* | (2006.01) |
| *G06Q 10/04* | (2012.01) |
| *G08G 1/16* | (2006.01) |

(52) U.S. Cl.
CPC .......... *G05D 1/0214* (2013.01); *B60W 30/08* (2013.01); *G01C 21/206* (2013.01); *G05D 1/0217* (2013.01); *G05D 1/0223* (2013.01); *G05D 1/0272* (2013.01); *G05D 1/0278* (2013.01); *G05D 1/0289* (2013.01); *G05D 1/0234* (2013.01); *G05D 1/0274* (2013.01); *G05D 2201/0216* (2013.01); *G06Q 10/047* (2013.01); *G08G 1/164* (2013.01); *G08G 1/166* (2013.01)

(58) Field of Classification Search
None
See application file for complete search history.

(56) References Cited

U.S. PATENT DOCUMENTS

| 5,006,988 A | 4/1991 | Borenstein et al. |
| 8,060,254 B2 | 11/2011 | Myeong et al. |
| (Continued) | | |

FOREIGN PATENT DOCUMENTS

EP    2045161 A1    4/2009

OTHER PUBLICATIONS

Fox D et al: "The Dynamic Window Approach to Collision Avoidance", IEEE Robotics & Automation Magazine, IEEE, Service Center, Piscataway, NJ, US, vol. 4, No. 1, Mar. 31, 1997 (Mar. 31, 1997).

(Continued)

*Primary Examiner* — Bhavesh V Amin
(74) *Attorney, Agent, or Firm* — Verrill Dana, LLP; John W. Powell

(57) ABSTRACT

A method and system for navigation of a robot along a goal path and avoiding obstacles. The method includes receiving goal pose for one or more robots and determining a goal path for a first robot while avoiding moving and fixed obstacles of a received obstacle map. A first objective function is evaluated to select a preferred velocity from a generated set of candidate velocities, the selecting based on one or more weighted cost functions. A set of velocity obstacles created based on the poses of the one or more robots and the preferred velocity is used in evaluating a second objective function to determine the motion of the robot in the next time cycle. Creating the set of velocity objects includes converting the preferred velocity from a non-holonomic to a holonomic velocity.

25 Claims, 16 Drawing Sheets

(56) References Cited

U.S. PATENT DOCUMENTS

| | | |
|---|---|---|
| 8,060,306 B2 | 11/2011 | Puhalla et al. |
| 8,209,144 B1 | 6/2012 | Anguelov et al. |
| 8,723,872 B2 | 5/2014 | Beardsley et al. |
| 8,793,069 B2 | 7/2014 | Kuroda |
| 9,067,320 B2 | 6/2015 | Beardsley et al. |
| 9,082,233 B2 | 7/2015 | Beardsley et al. |
| 9,145,286 B2 | 9/2015 | Pfaff et al. |
| 9,216,745 B2 | 12/2015 | Beardsley et al. |
| 9,286,810 B2 | 3/2016 | Eade et al. |
| 9,412,173 B2 | 8/2016 | Maynooth et al. |
| 9,592,609 B2 | 3/2017 | LaFary et al. |
| 10,108,194 B1 | 10/2018 | Russell |
| 2011/0082585 A1 | 4/2011 | Sofman et al. |
| 2011/0304633 A1 | 12/2011 | Beardsley et al. |
| 2015/0284010 A1 | 10/2015 | Beardsley et al. |
| 2016/0129907 A1 | 5/2016 | Kim et al. |
| 2016/0363454 A1 | 12/2016 | Hatanaka et al. |
| 2017/0270466 A1 | 9/2017 | Kao |
| 2018/0307941 A1 | 10/2018 | Kohl |

OTHER PUBLICATIONS

International Search Report and Written Opinion, dated Mar. 1, 2019, received in international patent application No. PCT/US2018/052165, 11 pages.
D. Fox, W. Burgard, and S. Thrun, "The Dynamic Window Approach to Collision Avoidance," in Robotics & Automation Magazine, IEEE, vol. 4, No. 1. (Mar. 1997), pp. 23-33.
Berthold K. P. Horn, "Closed-form solution of absolute orientation using unit quaternions," Journal of the Optical Society of America, 4(4), Apr. 1987, pp. 629-642.
Jur van den Berg, Stephen J. Guy, Ming Lin, and Dinesh Manocha. "Reciprocal n-body collision avoidance", in Robotics Research: The 14th International Symposium ISRR, Cédric Pradalier, Roland Siegwart, and Gerhard Hirzinger (eds.), Springer Tracts in Advanced Robotics, vol. 70, Springer-Verlag, May 2011, pp. 3-19.
Frese, Udo & Wagner, René & Röfer, Thomas. (2010). A SLAM overview from a users perspective. KI. 24. 191-198. 10.1007/s13218-010-0040-4.
Edwin Olson, "M3RSM: Many-to-many multi-resolution scan matching", Proceedings of the IEEE International Conference on Robotics and Automation (ICRA), Jun. 2015.
Edwin B. Olson, "Robust and Efficient Robotic Mapping", PhD Dissertation, Carnegie-Mellon University, 2008.
Sebastian Thrun, "Robotic Mapping: A Survey", Carnegie-Mellon University, CMU-CS-02-111, Feb. 2002.
Edwin B. Olson, "Real-Time Correlative Scan Matching", in Proceedings of the 2009 IEEE International Conference on Robotics and Automation (ICRA'09), IEEE Press, Piscataway, NJ, USA, 2009, pp. 1233-1239.
Olson Edwin: "M3RSM: Many-to-many multi-resolution scan matching", 2015 IEEE International Conference on Robotics and Automation (ICRA), IEEE, May 26, 2015 (May 26, 2015), pp. 5815-5821, XP033169227, DOI: 10.1109/ICRA.2015.7140013 [retrieved on Jun. 29, 2015].
Suzuki Shintaro et al: "Initial self-localization based on shared information for multi-robot teleoperation system", The SICE Annual Conference 2013, The Society of Instrument and Control Engineers—SICE, Sep. 14, 2013 (Sep. 14, 2013), pp. 2721-2726, XP032566351, [retrieved on Feb. 10, 2014].
Jianping Xie et al: "A real-time robust global localization for autonomous mobile robots in large environments", Control Automation Robotics&Vision (ICARCV), 2010 11th International Conference on, IEEE, Dec. 7, 2010 (Dec. 7, 2010).
Yuichiro Toda et al: "Intelligent planning based on multi-resolution map for simultaneous localization and mapping", Robotic Intelligence in Informationally Structured Space (RIISS), 2011 IEEE Workshop on, IEEE, Apr. 11, 2011 (Apr. 11, 2011).
International Search Report and Written Opinion, dated Mar. 6, 2019, received in international patent application No. PCT/US2018/052190, 8 pages.

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

FIG. 7

DYNAMIC WINDOW APPROACH USING OPTIMAL RECIPROCAL COLLISION AVOIDANCE COST-CRITIC

CROSS-REFERENCE TO RELATED APPLICATIONS

This application is related to U.S. application Ser. No. 15/712,222 filed Sep. 22, 2017 entitled "Multi-Resolution Scan Matching With Exclusion Zones", which is incorporated herein by reference.

FIELD OF THE INVENTION

The invention described herein relates generally to robot navigation along a goal path toward a target location in the presence of moving and stationary obstacles. Specifically, the present invention is an improved method for determining the trajectory of an incremental movement of a robot that avoids collisions with obstacles, while maximizing progress along the goal path.

BACKGROUND OF THE INVENTION

In many applications, robots are used to perform functions in place of humans or to assist humans in order to increase productivity and efficiency. One such application is order fulfillment, which is typically performed in a large warehouse filled with products to be shipped to customers who have placed their orders over the internet for home delivery. Fulfilling such orders in a timely, accurate and efficient manner is logistically challenging to say the least.

In an online Internet shopping application, for example, clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address.

An important goal of the order fulfillment process is thus to ship as many items in as short a time as possible. The process of receiving an order, planning its fulfillment, finding the storage shelf or bin, picking the product, and repeating the process for each item on the order, then delivering the order to a shipping station is repetitive and labor intensive. In a warehouse stocked with thousands or tens of thousands of items of rapidly turning inventory, robots play a critical role in ensuring timely and efficient order fulfillment. In addition, the products that will ultimately be shipped first need to be received in the warehouse and stored or "placed" in storage bins in an orderly fashion throughout the warehouse so they can be readily retrieved for shipping.

Using robots to perform picking and placing functions may be done by the robot alone or with the assistance of human operators. Picking and placing or stocking functions, whether or not performed with human interaction, requires that the robot navigate from its present location to a target product storage or "bin" location. Along the robot's goal path from present location to product storage bin, the robot typically encounters stationary and moving obstacles such as walls, shelves, support structure, humans and other robots. Furthermore, as new product is stocked and depleted, as new shelves and bins are added and removed, and as miscellaneous objects are introduced into the shared human-robot space, the dynamic nature of an order fulfillment warehouse requires constant updating of information about the warehouse and its contents.

Obstacle avoidance while navigating the robot's goal path involves computing a series of increment movements using information on nearby fixed and moving obstacles. The incremental movement must not drive the robot into an obstacle, fixed or moving, and the trajectory of the robot to drive its movement must be computed within a fixed cycle time. Known methods of robot navigation, however, choose between approaches better suited to navigating fixed obstacles and approaches better suited for navigating moving obstacles, i.e. robots. What is needed is a computationally efficient method for robot navigation considering both moving and fixed obstacles, thus improving the ability of the robot to make progress toward its target location in the allotted cycle time for each increment movement.

BRIEF SUMMARY OF THE INVENTION

The benefits and advantages of the present invention will be readily apparent from the Brief Summary of the Invention and Detailed Description to follow. One skilled in the art will appreciate that the present teachings can be practiced with embodiments other than those summarized or disclosed below.

In a first aspect, there is a method for navigation of a robot along a goal path and avoiding obstacles. The method includes receiving a goal pose for a first robot, determining a goal path for the first robot, receiving an obstacle map, receiving the pose of the first robot, receiving the pose of one or more other robots, generating a set of candidate velocities for the first robot, evaluating using a first objective function the first set of candidate velocities, selecting, based on the first objective function, a first preferred velocity of the first robot, creating a set of velocity obstacles based on the pose(s) of the one or more other robots and the first preferred velocity of the first robot, evaluating using a second objective function the set of candidate velocities selecting based on the second objective function a second preferred velocity for the first robot, and moving the first robot based on the second preferred velocity.

In one embodiment, the goal path may be a path from a current pose of the first robot to the goal pose of the first robot. The goal pose of the robot may be the pose of a fiduciary associated product bin in an order fulfillment warehouse application.

In some embodiments, the pose of the first robot may be determined by one or more of many-to-many multiresolution scan matching (M3RSM), adaptive monte carlo localization (AMCL), geo-positioning satellite (GPS), fiducial information, and odometry-based on robot sensors.

In a preferred embodiment, generating the set of candidate velocities for the first robot includes assuming a candidate velocity over one or more time steps applying motion, obstacle, and inertial constraints to generate only candidate velocities having admissible trajectories.

In another embodiment, the first objective function is comprised of one or more cost functions of the form $G(v,\omega)=\alpha^*\text{heading}(v,\omega)+\beta^*\text{dist}(v,\omega)+\gamma^*\text{velocity}(v,\omega)$,
where $G(v,\omega)$ is the objective function, $\alpha, \beta, \gamma$ are weights; $\text{heading}(v,\omega)$ is a measure of progress along the goal path; $\text{dist}(v,\omega)$ is the distance to the nearest obstacle (its "clearance"); and $\text{velocity}(v,\omega)$ is the forward velocity of the robot for a given candidate velocity $(v,\omega)$. The first objective function may further include one or more of a path cost function which scores how much the candidate velocity would radiate from the goal path; an obstacle cost function scoring proximity to obstacles; or an oscillation cost function assigning higher costs to changes in rotational velocity from a previous preferred velocity. The cost functions of the first objective function may invalidate a candidate velocity by assigning a highest cost score to the candidate velocity.

In yet another embodiment, creating the set of velocity objects includes converting the preferred velocity from a non-holonomic to a holonomic velocity. Converting the preferred velocity to a holonomic velocity may include increasing the radius of the one or more other robots by a maximum distance between a preferred trajectory and a straight-line trajectory.

In a preferred embodiment, the second objective function is comprised of one or more cost functions of the form ORCA/DWA=$C_{DWA}+\alpha_{ORCA}*C_{ORCA}$, where $C_{DWA}$ is defined as $C_{DWA}=\alpha*heading(v,\omega)+\beta*dist(v,\omega)+\gamma*velocity(v,\omega)$ with $\alpha, \beta, \gamma$ as weights; heading(v,$\omega$) a measure of progress along the goal path; dist(v,$\omega$) is the distance to the nearest obstacle; and velocity(v,$\omega$) is the forward velocity of the robot for a given candidate velocity (v,$\omega$), and where $C_{ORCA}$ is defined as $C_{ORCA}=\alpha_v (v_t-v_{pref})+penalty+\alpha_d*d (P, v_t)$, where $\alpha_d$ and $\alpha_v$ are weights; $v_t$ is a candidate velocity being evaluated; $v_{pref}$ is the preferred velocity; P is the polygon formed by the union of VOs; d (P, $v_t$) is a measure of how much a candidate velocity violates the VOs; and penalty is a penalty cost imposed when a candidate velocity $v_t$ violates a VO. Further, cost function d (P, vt) is a function of the minimum distance from the perimeter of polygon P to a point defined by the trajectory t reached by candidate velocity vt.

In a second aspect of the invention, there is a robot system for navigation of a robot along a goal path and avoiding obstacles, including a transceiver, a data storage device, a data processor and a data storage device having instructions stored thereon for execution by the data processor. The instructions stored thereon instruct the robot system to receive a goal pose for a first robot, determining a goal path for the first robot, receive an obstacle map, receive the pose of the first robot, receive the pose of one or more other robots, generate a set of candidate velocities for the first robot, evaluate using a first objective function the first set of candidate velocities, select based on the first objective function a first preferred velocity of the first robot, create a set of velocity obstacles based on the pose(s) of the one or more other robots and the first preferred velocity of the first robot, evaluate using a second objective function the set of candidate velocities selecting based on the second objective function a second preferred velocity for the first robot, and move the first robot based on the second preferred velocity.

In one embodiment of this second aspect, the goal path may be a path from a current pose of the first robot to the goal pose of the first robot. The goal pose of the robot may be the pose of a fiduciary associated product bin in an order fulfillment warehouse application.

In a preferred embodiment, generating the set of candidate velocities for the first robot includes assuming a candidate velocity over one or more time steps applying motion, obstacle, and inertial constraints to generate only candidate velocities having admissible trajectories.

In another embodiment, the first objective function is comprised of one or more cost functions of the form $G(v,\omega)=\alpha*heading(v,\omega)+\beta*dist(v,\omega)+\gamma*velocity(v,\omega)$, where G(v,$\omega$) is the objective function, $\alpha, \beta, \gamma$ are weights; heading(v,$\omega$) is a measure of progress along the goal path; dist(v,$\omega$) is the distance to the nearest obstacle (its "clearance"); and velocity(v,$\omega$) is the forward velocity of the robot for a given candidate velocity (v,$\omega$). The first objective function may further include one or more of a path cost function which scores how much the candidate velocity would radiate from the goal path; an obstacle cost function scoring proximity to obstacles; or an oscillation cost function assigning higher costs to changes in rotational velocity from a previous preferred velocity. The cost functions of the first objective function may invalidate a candidate velocity by assigning a highest cost score to the candidate velocity.

In yet another embodiment, creating the set of velocity objects includes converting the preferred velocity from a non-holonomic to a holonomic velocity. Converting the preferred velocity to a holonomic velocity may include increasing the radius of the one or more other robots by a maximum distance between a preferred trajectory and a straight-line trajectory.

In a preferred embodiment, the second objective function is comprised of one or more cost functions of the form ORCA/DWA=$C_{DWA}+\alpha_{ORCA}*C_{ORCA}$, where $C_{DWA}$ is defined as $C_{DWA}=\alpha*heading(v,\omega)+\beta*dist(v,\omega)+\gamma*velocity(v,\omega)$ with $\alpha, \beta, \gamma$ as weights; heading(v,$\omega$) a measure of progress along the goal path; dist(v,$\omega$) is the distance to the nearest obstacle; and velocity(v,$\omega$) is the forward velocity of the robot for a given candidate velocity (v,$\omega$), and where $C_{ORCA}$ is defined as $C_{ORCA}=\alpha_v (v_t-v_{pref})+penalty+\alpha_d*d (P, v_t)$, where $\alpha_d$ and $\alpha_v$ are weights; $v_t$ is a candidate velocity being evaluated; $v_{pref}$ is the preferred velocity; P is the polygon formed by the union of VOs; d (P, $v_t$) is a measure of how much a candidate velocity violates the VOs; and penalty is a penalty cost imposed when a candidate velocity $v_t$ violates a VO. Further, cost function d (P, vt) is a function of the minimum distance from the perimeter of polygon P to a point defined by the trajectory t reached by candidate velocity vt.

In a third aspect of the invention, there is a robot system including a plurality of robots under the supervision of a supervisory system for performing the methods of the first aspect.

BRIEF DESCRIPTION OF THE FIGURES

Embodiments of the present invention will now be described, by way of example only, with reference to the attached Figures, wherein:

FIG. 6 is a table of the fiducial identification to pose mapping;

FIG. 7 is a table of the bin location to fiducial identification mapping;

DETAILED DESCRIPTION OF THE INVENTION

Figure 1:
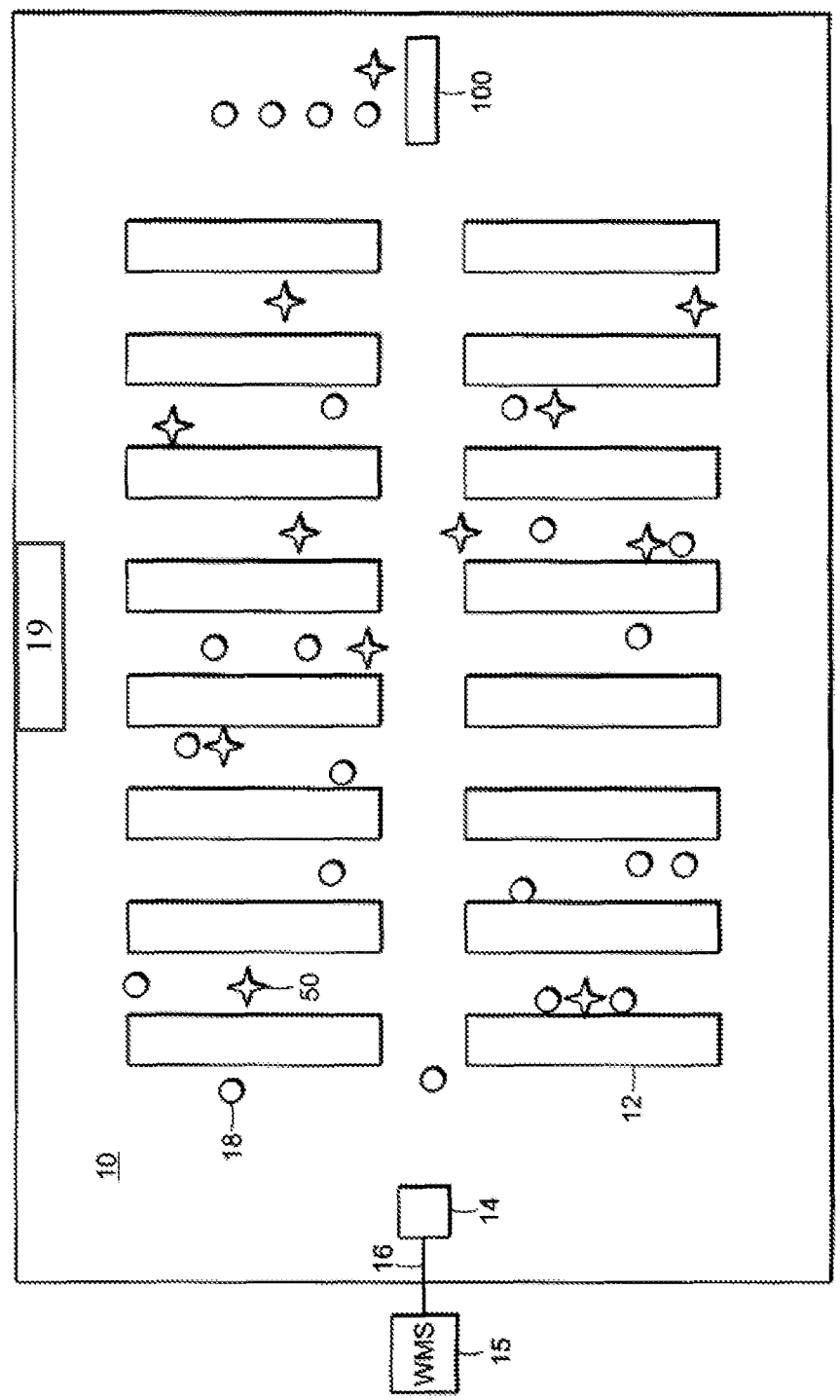
FIG. 1 is a top plan view of an order-fulfillment warehouse.

The invention described herein is directed to methods and systems for use with an autonomous or semi-autonomous robot for improved navigation of the robot from a current location to a target location along its "goal path" within an environment containing obstacles and free space. Specifically, the methods and systems of the present invention provide a computationally efficient improvement over the prior art for accurately determining the next instantaneous velocity to apply to the robot's propulsion control using a combination of constraint-based obstacle avoidance methods.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Moreover, it is noted that like reference numerals represent similar parts throughout the several views of the drawings.

Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure.

One skilled in the art will appreciate that the present teachings can be practiced with embodiments other than those disclosed. While the description provided herein is focused on picking items from bin locations in the warehouse to fulfill an order for shipment to a customer, the system is equally applicable to the storage or placing of items received into the warehouse in bin locations throughout the warehouse for later retrieval and shipment to a customer. The invention is also applicable to inventory control tasks associated with such a warehouse system, such as, consolidation, counting, verification, inspection and clean-up of products.

The methods and systems of the present invention may also be applied in other types of environments with other types of obstacles for other types of applications. Any physical object or structure, stationary or dynamic, may be considered an "obstacle" in an application of the present invention. Obstacles may further include humans and other robots operating within the environment, and the location of the humans and other robots may be current locations or target locations in the performance of cooperative tasks. Target locations may include one or more locations within the environment for positioning one or more robots to perform or to assist a human in the performance of a task or succession of tasks.

These and other benefits and advantages will become readily apparent from the examples and illustrations described below.

Referring to FIG. 1, a typical order fulfillment warehouse 10 includes shelves 12 filled with the various items that could be included in an order 16. In operation, the order 16 from warehouse management server 15 arrives at an order-server 14. The order-server 14 communicates the order 16 to a robot 18 selected from a plurality of robots that roam the warehouse 10. Also shown is charging area 19, which is where one or more charging stations according to an aspect of the invention may be located.

Figure 2A:
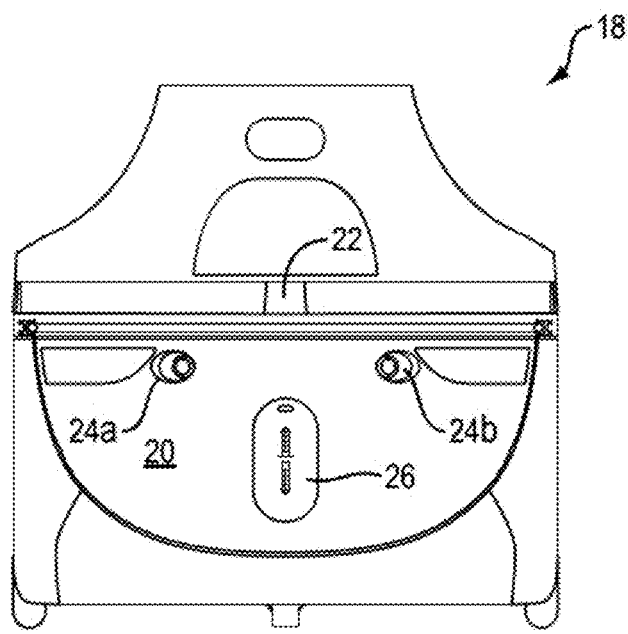
FIG. 2A is a front elevational view of a base of one of the robots used in the warehouse shown in FIG. 1.
Figure 2B:
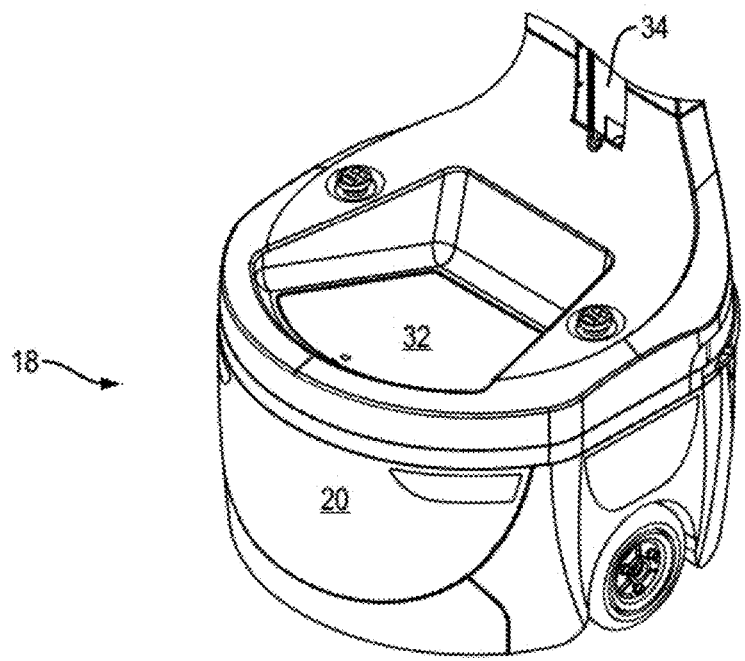
FIG. 2B is a perspective view of a base of one of the robots used in the warehouse shown in FIG. 1.
Figure 3:
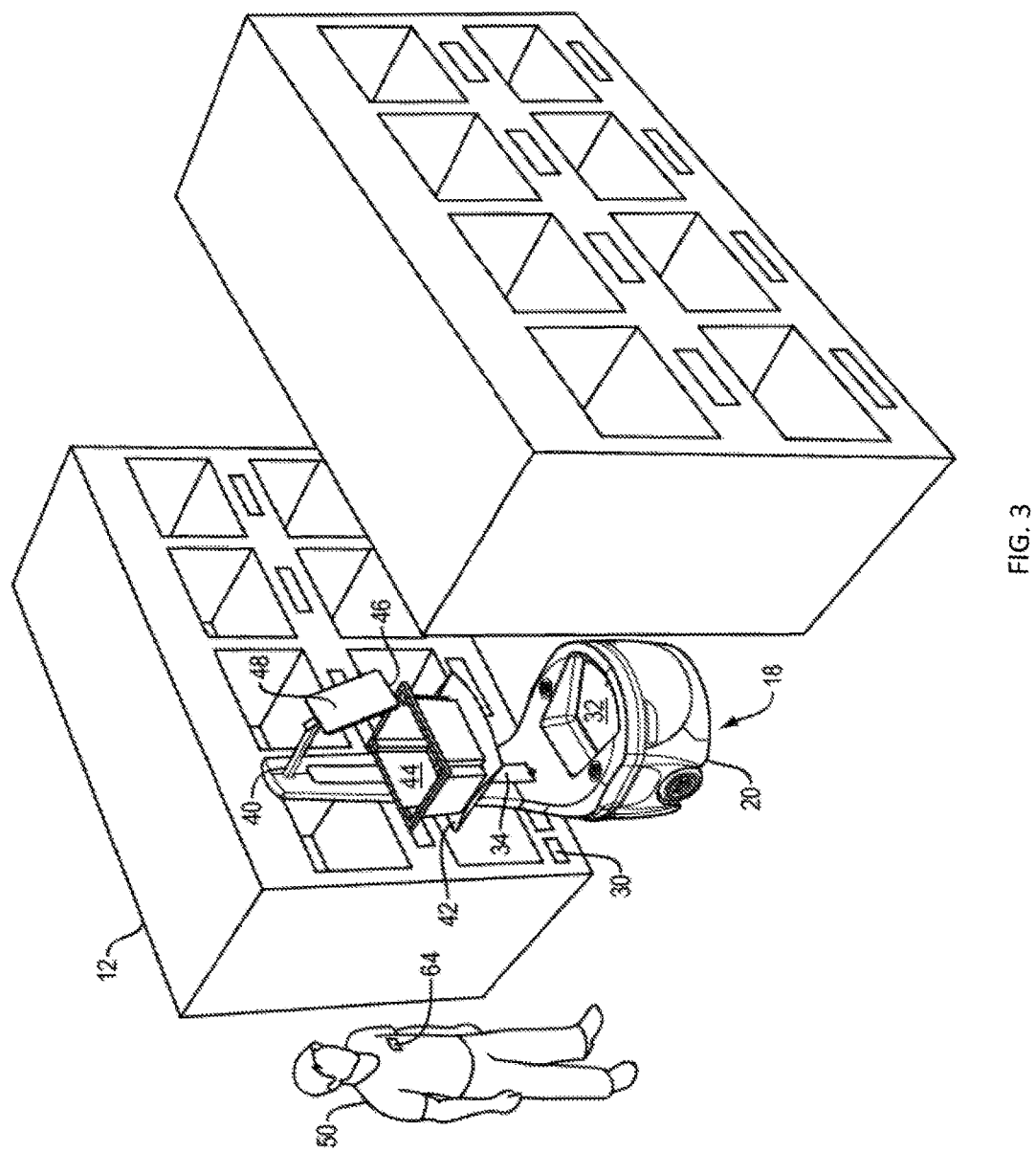
FIG. 3 is a perspective view of the robot in FIGS. 2A and 2B outfitted with an armature and parked in front of a shelf shown in FIG. 1.

In a preferred embodiment, a robot 18, shown in FIGS. 2A and 2B, includes an autonomous wheeled base 20 having a laser radar 22. The base 20 also features a transceiver (not shown) that enables the robot 18 to receive instructions from the order-server 14, and a pair of digital optical cameras 24a and 24b. The robot base also includes an electrical charging port 26 for re-charging the batteries which power autonomous wheeled base 20. The base 20 further features a processor (not shown) that receives data from the laser radar 22 and cameras 24a and 24b to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8. Fiducial markers are also used to identify charging stations according to an aspect of this invention and the navigation to such charging station fiducial markers is the same as the navigation to the bin/location of items ordered. Once the robots navigate to a charging station, a more precise navigation approach is used to dock the robot with the charging station and such a navigation approach is described below.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although robot 18 excels at moving around the warehouse 10, with current robot technology, it is not very good at quickly and efficiently picking items from a shelf and placing them in the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48 (or laptop/other user input device), which the local operator 50 can read, or by transmitting the order to a handheld device used by the local operator 50.

Upon receiving an order 16 from the order server 14, the robot 18 proceeds to a first warehouse location, e.g. as shown in FIG. 3. It does so based on navigation software stored in the memory and carried out by the processor. The navigation software relies on data concerning the environment, as collected by the laser radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location, the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a packing station 100, FIG. 1, where they are packed and shipped.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The navigation approach of this invention, as well as the semantic mapping of a SKU of an item to be retrieved to a fiducial ID/pose associated with a fiducial marker in the warehouse where the item is located, is described in detail below with respect to FIGS. 4-8. As noted above, the same navigation approach may be used to enable the robot to navigate to a charging station in order to recharge its battery.

Using one or more robots 18, a map of the warehouse 10 must be created and dynamically updated to determine the location of objects, both static and dynamic, as well as the locations of various fiducial markers dispersed throughout the warehouse. To do this, one of the robots 18 navigate the warehouse and build/update a map 10a, FIG. 4, utilizing its laser radar 22 and simultaneous localization and mapping (SLAM), which is a computational method of constructing or updating a map of an unknown environment. SLAM approximate solution methods include the pose graph, particle filter and extended Kalman filter methods. The SLAM GMapping approach is the preferred approach, but any suitable SLAM approach can be used. A discussion of SLAM can be found in Frese, U., Wagner, R., Rofer, T., "A SLAM overview from a user's perspective," Künstliche Intelligenz 24(3), 191-198 (2010), which is incorporated herein by reference.

Order Fulfillment

Robot 18 utilizes its laser radar 22 to create/update map 10a of warehouse 10 as robot 18 travels throughout the space identifying open space 112, walls 114, objects 116, and other static obstacles such as shelves 12a in the space, based on the reflections it receives as the laser radar scans the environment.

Figure 4:
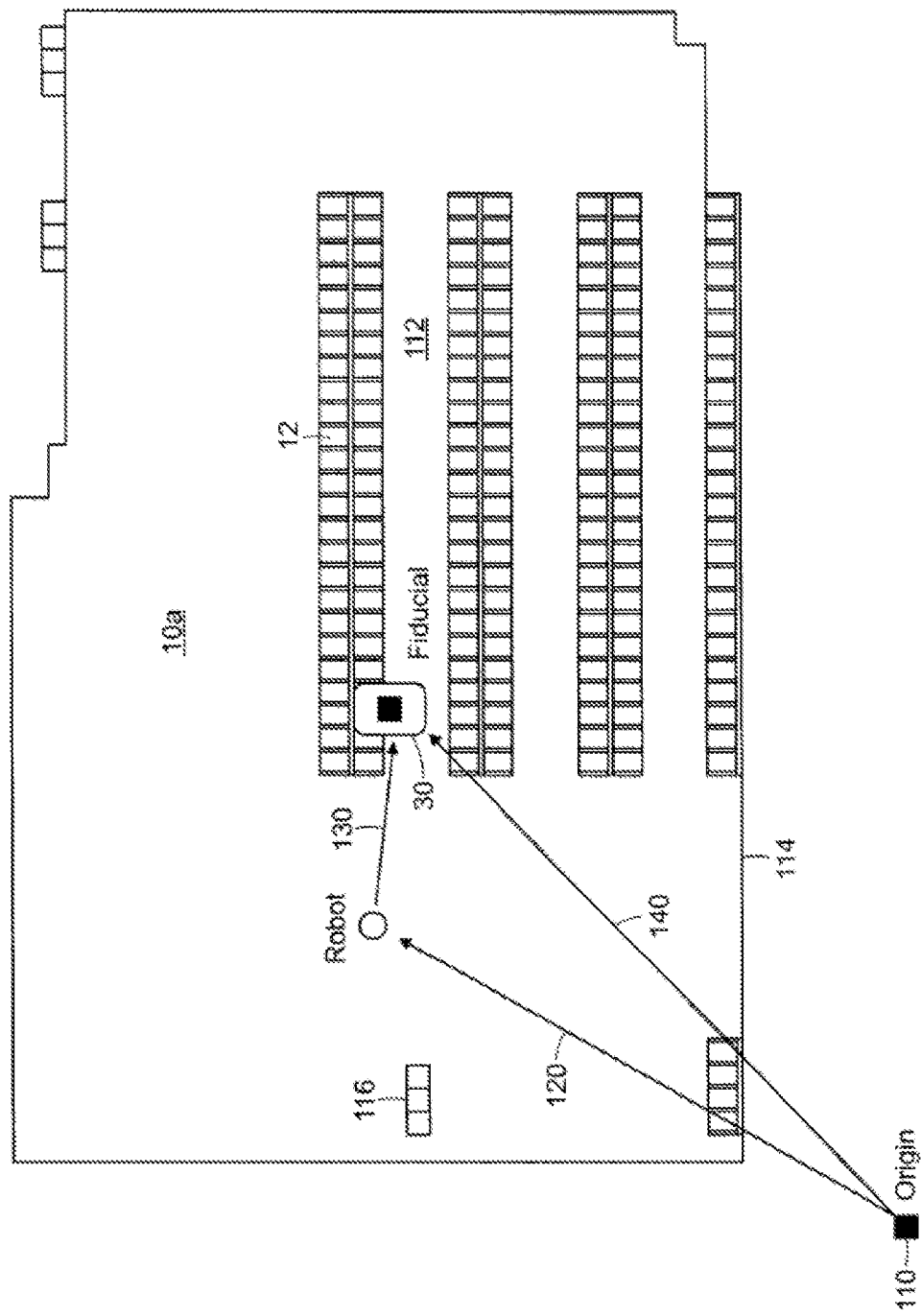
FIG. 4 is a partial map of the warehouse of FIG. 1 created using laser radar on the robot.

While constructing the map 10a or thereafter, one or more robots 18 navigates through warehouse 10 using cameras 24a and 24b to scan the environment to locate fiducial markers (two-dimensional bar codes) dispersed throughout the warehouse on shelves proximate bins, such as 32 and 34, FIG. 3, in which items are stored. Robots 18 use a known reference point or origin for reference, such as origin 110. When a fiducial marker, such as fiducial marker 30, FIGS. 3 and 4, is located by robot 18 using its cameras 24a and 24b, the location in the warehouse relative to origin 110 is determined. By using two cameras, one on either side of robot base, as shown in FIG. 2A, the robot 18 can have a relatively wide field of view extending out from both sides of the robot. This enables the robot to see, for example, fiducial markers on both sides of it as it travels up and down aisles of shelving.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by x,y,z coordinates relative to origin 110 and by a quaternion (x, y, z, ω) for fiducial marker 30 can be determined. A discussion of using quaternions to represent and effect orientations is found in Berthold K. P. Horn, "Closed-form solution of absolute orientation using unit quaternions," Journal of the Optical Society of America, 4(4), April 1987, pp. 629-642, which is incorporated by reference herein. One skilled in the art would recognize that other coordinate systems and techniques for determination of fiducial marker position and orientation may be used, and that pose may determine an absolute or relative position and/or orientation from an arbitrary origin.

Figure 5:
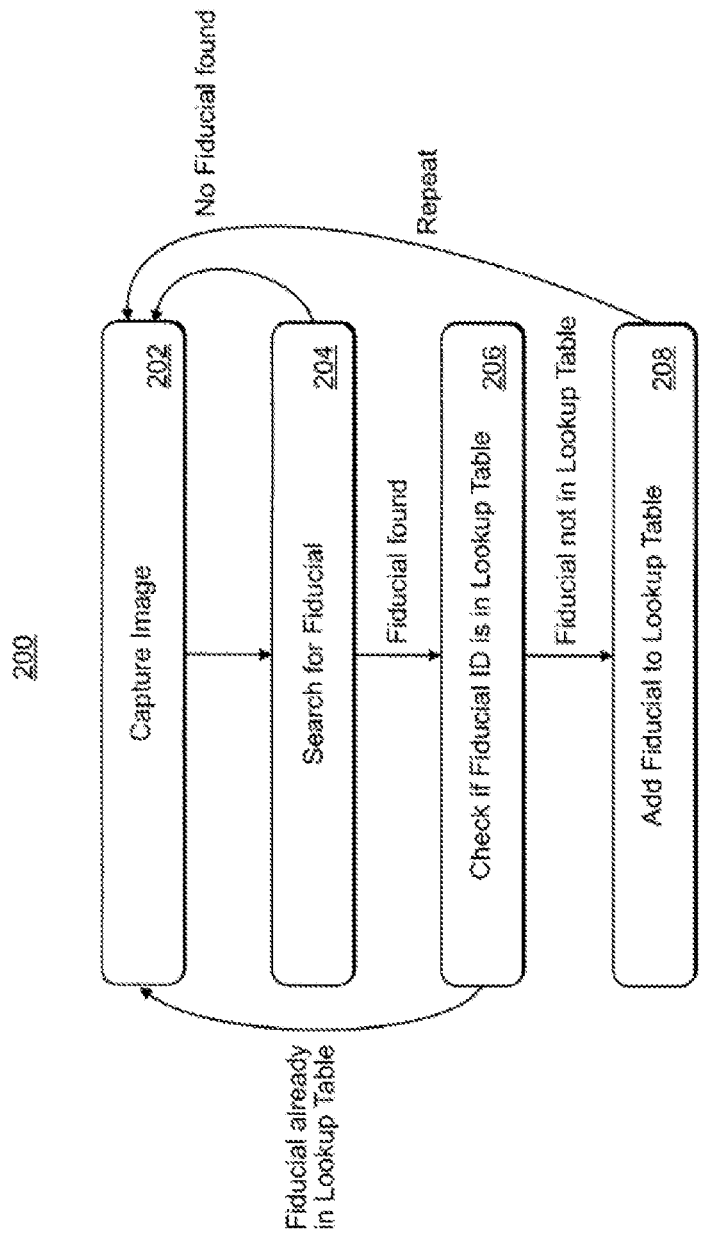
FIG. 5 is a flowchart depicting the process for locating fiducial markers dispersed throughout the warehouse and storing fiducial marker poses.

Flowchart 200, FIG. 5, describing the fiducial marker location process is described. This is performed in an initial mapping mode and as robot 18 encounters new fiducial markers in the warehouse while performing picking, placing and/or other tasks. In step 202, robot 18 using cameras 24a and 24b captures an image and in step 204 searches for fiducial markers within the captured images. In step 206, if a fiducial marker is found in the image (step 204) it is determined if the fiducial marker is already stored in fiducial table 300, FIG. 6, which is located in a memory of robot 18. If the fiducial information is stored in memory already, the flowchart returns to step 202 to capture another image. If it is not in memory, the pose is determined according to the process described above and in step 208, it is added to fiducial-to-pose lookup table 300.

In look-up table 300, which may be stored in the memory of each robot, there are included for each fiducial marker a fiducial identification, 1, 2, 3, etc., and a pose for the fiducial marker/bar code associated with each fiducial identification. The pose consists of the x,y,z coordinates in the warehouse relative to origin 110, along with the orientation or the quaternion (x,y,z,ω).

In another look-up Table 400, FIG. 7, which may also be stored in the memory of each robot, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker. Charging stations located in charging area 19, FIG. 1, may also be stored in table 400 and correlated to fiducial IDs. From the fiducial IDs, the pose of the charging station may be found in table 300, FIG. 6.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, robot 18 can determine the pose of the fiducial ID using the information in table 300, FIG. 6, and then navigate to the pose as described herein.

Figure 8:
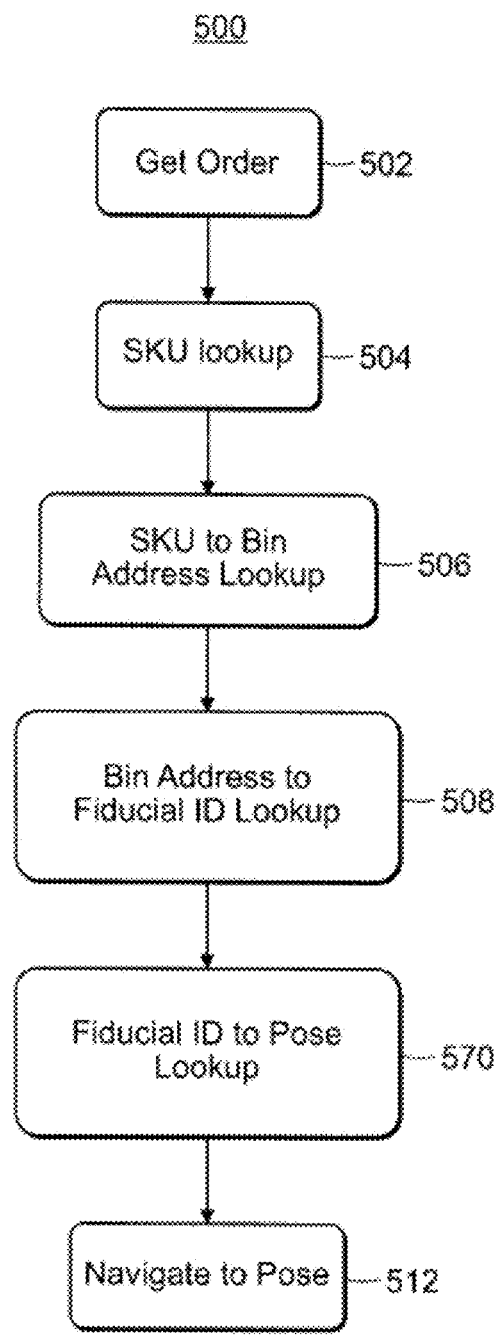
FIG. 8 is a flowchart depicting product SKU to pose mapping process.

The order fulfillment process according to this invention is depicted in flowchart 500, FIG. 8. In step 502, warehouse management system (WMS) 15, FIG. 1, obtains an order, which may consist of one or more items to be retrieved. In step 504, the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 22, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

Generally, localization of the robot within warehouse 10a is achieved by many-to-many multiresolution scan matching (M3RSM) operating on the SLAM map. Compared to brute force methods, M3RSM dramatically reduces the computational time for a robot to perform scan matching for determining the robot's current pose. A discussion of M3RSM can be found in Edwin Olson, "M3RSM: Many-to-many multi-resolution scan matching", Proceedings of the IEEE International Conference on Robotics and Automation (ICRA), June 2015, which is incorporated herein by reference. Robot localization is further improved by minimizing the M3RSM search space according to methods disclosed in related U.S. patent application Ser. No. 15/712,222, which is incorporated by reference herein.

With the product SKU/fiducial ID to fiducial pose mapping technique combined with the SLAM navigation technique both described herein, robots 18 are able to very efficiently and effectively navigate the warehouse space without having to use more complex navigation approaches, which typically involve grid lines and intermediate fiducial markers to determine location within the warehouse.

Generally, navigation in the presence of other robots and moving obstacles in the warehouse is achieved by collision avoidance methods including the dynamic window approach (DWA) and optimal reciprocal collision avoidance (ORCA). DWA computes among feasible robot motion trajectories an incremental movement that avoids collisions with obstacles and favors the desired path to the target fiducial marker. ORCA optimally avoids collisions with other moving robots without requiring communication with the other robot(s). Navigation proceeds as a series of incremental movements along trajectories computed at the approximately 50 ms update intervals. Collision avoidance may be further improved by techniques described herein.

Robot System

Figure 9:
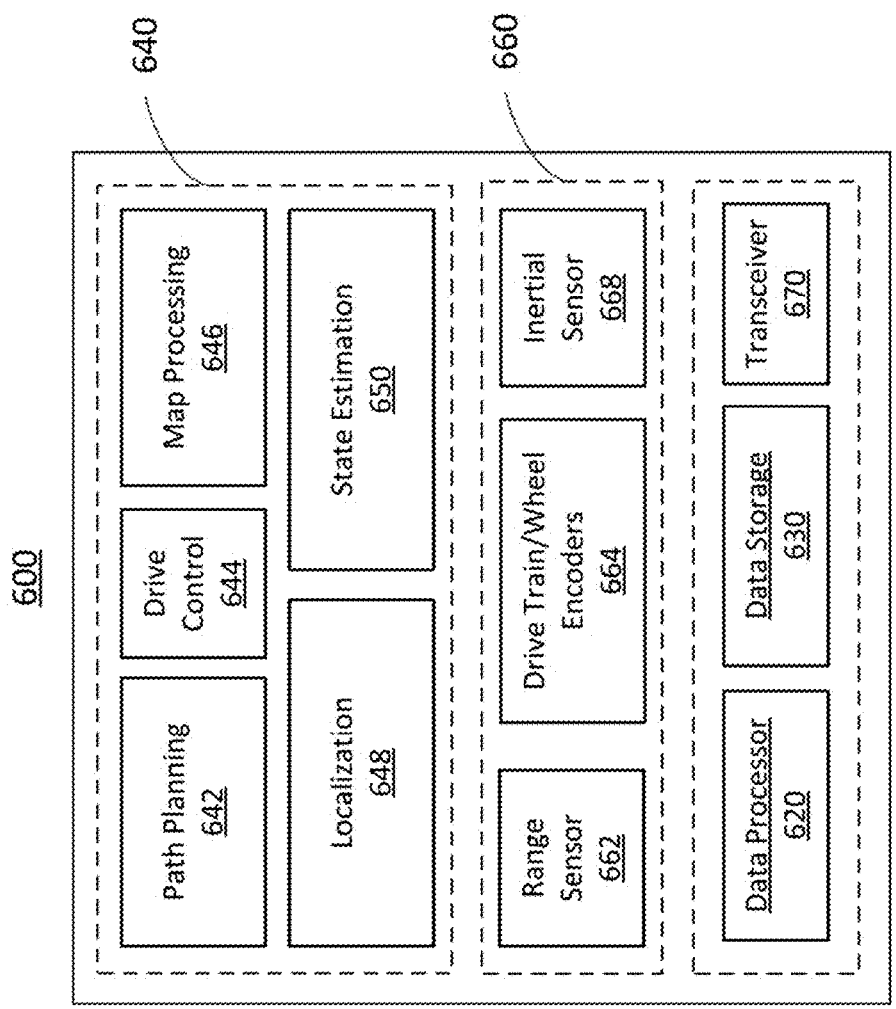
FIG. 9 shows one embodiment of a robot system for use with the methods and systems of present invention.

FIG. 9 illustrates a system view of one embodiment of robot 18 for use in the above described order fulfillment warehouse application. Robot system 600 comprises data processor 620, data storage 630, processing modules 640, and sensor support modules 660. Processing modules 640 may include path planning module 642, drive control module 644, map processing module 646, localization module 648, and state estimation module 650. Sensor support modules 660 may include range sensor module 662, drive train/wheel encoder module 664, and inertial sensor module 668.

Data processor 620, processing modules 642 and sensor support modules 660 are capable of communicating with any of the components, devices or modules herein shown or described for robot system 600. A transceiver module 670 may be included to transmit and receive data. Transceiver module 670 may transmit and receive data and information to and from a supervisory system or to and from one or other robots. Transmitting and receiving data may include map data, path data, search data, sensor data, location and orientation data, velocity data, and processing module instructions or code, robot parameter and environment settings, and other data necessary to the operation of robot system 600.

In some embodiments, range sensor module 662 may comprise one or more of a scanning laser radar, laser range finder, range finder, ultrasonic obstacle detector, a stereo vision system, a monocular vision system, a camera, and an imaging unit. Range sensor module 662 may scan an environment around the robot to determine a location of one or more obstacles with respect to the robot. In a preferred embodiment, drive train/wheel encoders 664 comprises one or more sensors for encoding wheel position and an actuator for controlling the position of one or more wheels (e.g., ground engaging wheels). Robot system 600 may also include a ground speed sensor comprising a speedometer or radar-based sensor or a rotational velocity sensor. The rotational velocity sensor may comprise the combination of an accelerometer and an integrator. The rotational velocity sensor may provide an observed rotational velocity for the data processor 620, or any module thereof.

In some embodiments, sensor support modules 660 may provide translational data, position data, rotation data, level data, inertial data, and heading data, including historical data of instantaneous measures of velocity, translation, position, rotation, level, heading, and inertial data over time. The translational or rotational velocity may be detected with reference to one or more fixed reference points or stationary objects in the robot environment. Translational velocity may be expressed as an absolute speed in a direction or as a first derivative of robot position versus time. Rotational velocity may be expressed as a speed in angular units or as the first derivative of the angular position versus time. Translational and rotational velocity may be expressed with respect to an origin 0,0 (e.g. FIG. 1, 110) and bearing of 0-degrees relative to an absolute or relative coordinate system. Processing modules 640 may use the observed translational velocity (or position versus time measurements) combined with detected rotational velocity to estimate observed rotational velocity of the robot.

In some embodiments, robot system 600 may include a GPS receiver, a GPS receiver with differential correction, or another receiver for determining the location of a robot with respect to satellite or terrestrial beacons that transmit wireless signals. Preferably, in indoor applications such as the warehouse application described above or where satellite reception is unreliable, robot system 600 uses non-GPS sensors as above and techniques described herein to improve localization where no absolute position information is reliably provided by a global or local sensor or system.

In other embodiments, modules not shown in FIG. 9 may comprise a steering system, braking system, and propulsion system. The braking system may comprise a hydraulic braking system, an electro-hydraulic braking system, an electro-mechanical braking system, an electromechanical actuator, an electrical braking system, a brake-by-wire braking system, or another braking system in communication with drive control 644. The propulsion system may comprise an electric motor, a drive motor, an alternating current motor, an induction motor, a permanent magnet motor, a direct current motor, or another suitable motor for propelling a robot. The propulsion system may comprise a motor controller (e.g., an inverter, chopper, wave generator, a multiphase controller, variable frequency oscillator, variable current supply, or variable voltage supply) for controlling at least one of the velocity, torque, and direction of rotation of the motor shaft of the electric motor. Preferably, drive control 644 and propulsion system (not shown) is a differential drive (DD) control and propulsion system. In a DD control system robot control is non-holonomic (NH), characterized by constraints on the achievable incremental path given a desired translational and angular velocity. Drive control 644 in communication with propulsion system may actuate incremental movement of the robot by converting one or more instantaneous velocities determined by path planning module 642 or data processor 620.

One skilled in the art would recognize other systems and techniques for robot processing, data storage, sensing, control and propulsion may be employed without loss of applicability of the present invention described herein.

Navigation

Figure 10:
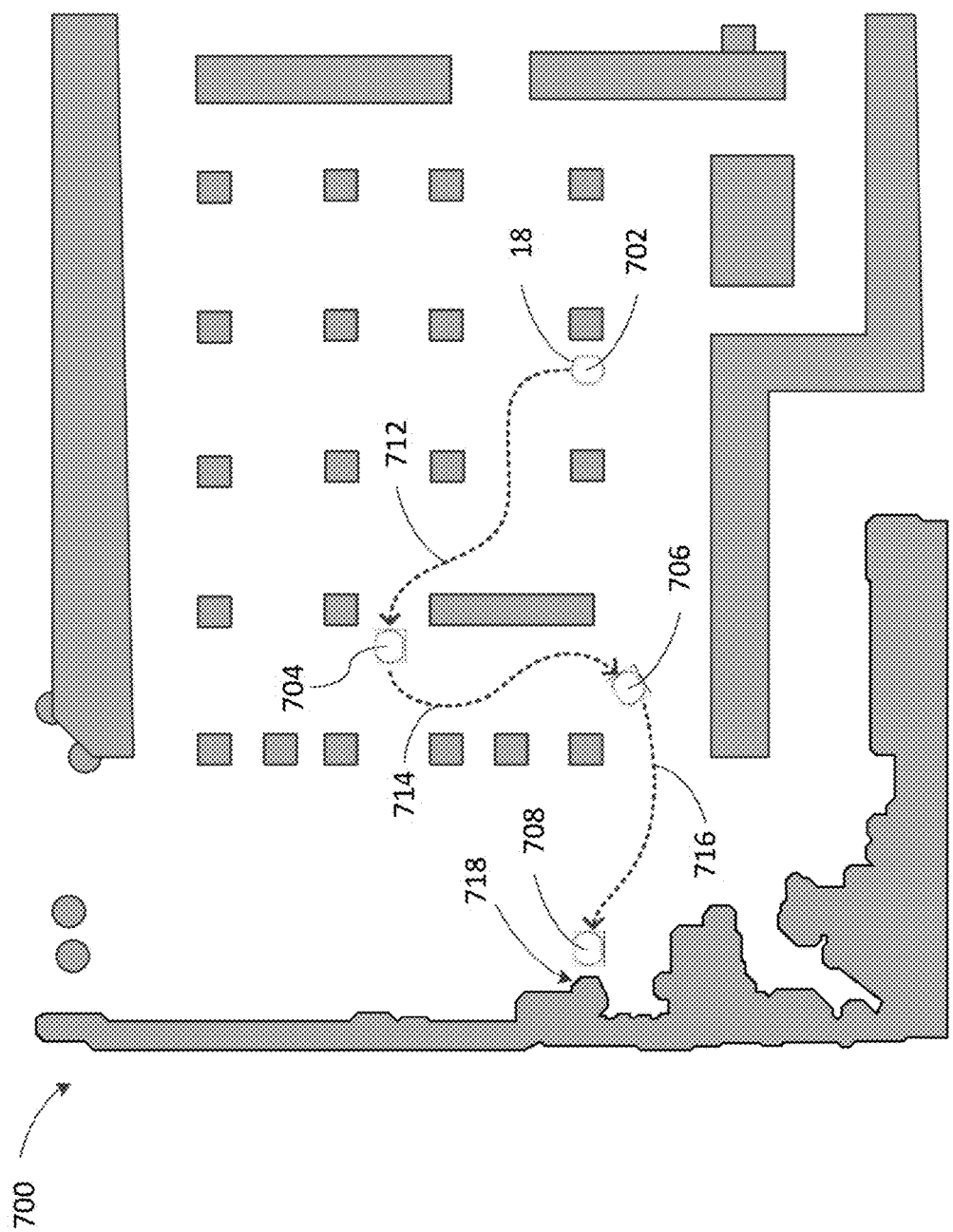
FIG. 10 depicts generalized navigation of a robot from a current location to a target location through an environment represented by a spatial map.

Navigation by an autonomous or semi-autonomous robot requires some form of spatial model of the robot's environment. Spatial models may be represented by bitmaps, object maps, landmark maps, and other forms of two- and three-dimensional digital representations. A spatial model of a warehouse facility, as shown in FIG. 10 for example, may represent a warehouse and obstacles within such as walls, ceilings, roof supports, windows and doors, shelving and storage bins. Obstacles may be stationary or moving, for example, such as other robots or machinery operating within the warehouse, or relatively fixed but changing, such as temporary partitions, pallets, shelves and bins as warehouse items are stocked, picked and replenished.

Spatial models in a warehouse facility may also represent target locations such as a shelf or bin marked with a fiducial to which a robot may be directed to pick product or to perform some other task, or to a temporary holding location or to the location of a charging station. For example, FIG. 10 depicts the navigation of robot 18 from a starting location 702 to intermediate locations 704,706 to destination or target location 708 along its path 712,714,716. Here the spatial model captures features of the environment through which the robot must navigate, including features of a structure at a destination 718 which may be a shelf or bin or a robot charger station.

Figure 11:
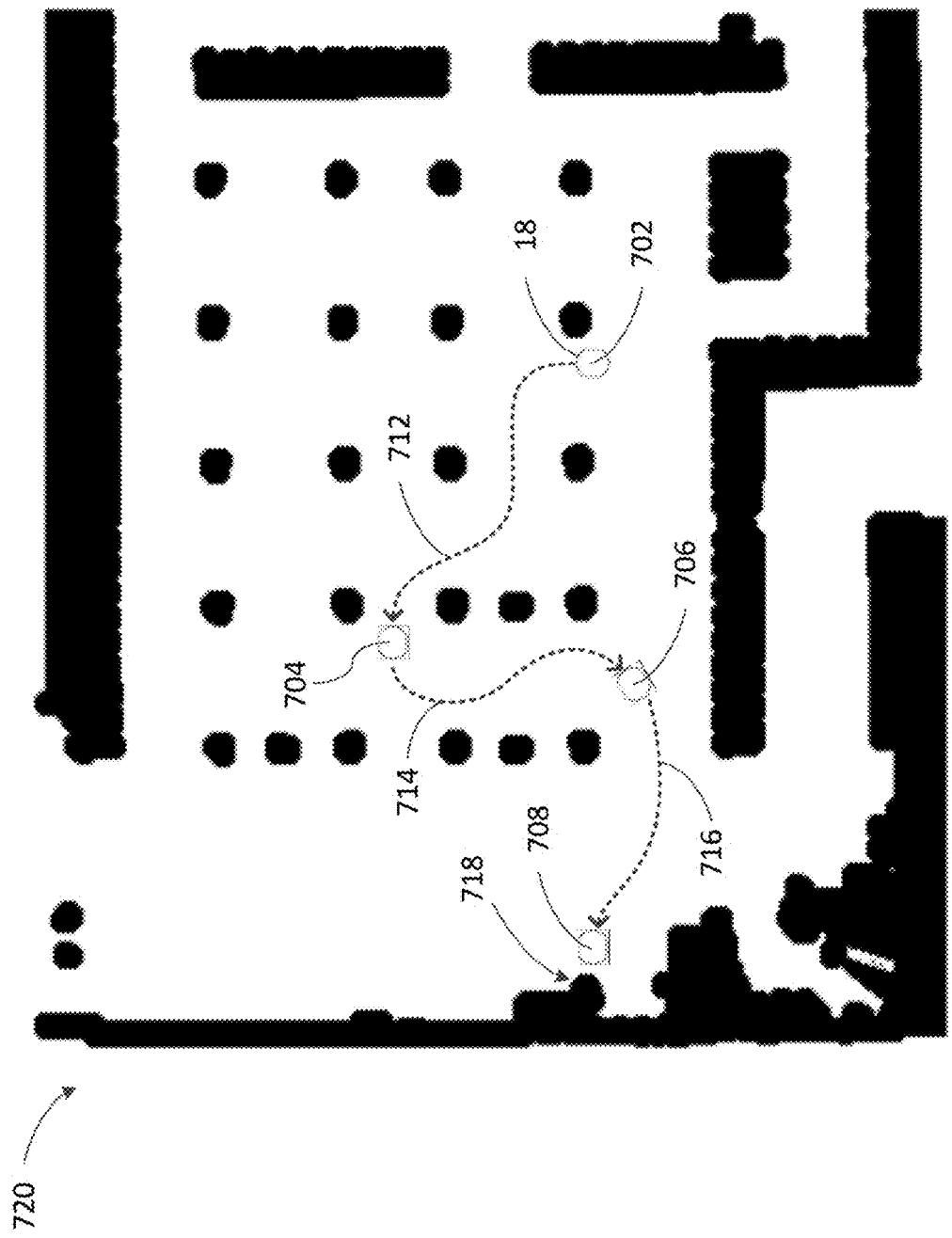
FIG. 11 depicts navigation of robot in relation to a SLAM map of the environment of FIG. 10, according to one aspect of the invention.

The spatial model most commonly used for robot navigation is a bitmap of an area or facility. FIG. 11, for example, depicts a two-dimensional bitmap of the spatial model shown in FIG. 10. Map 720 may be represented by bitmaps having pixel values in a binary range 0,1, representing black or white, or by a range of pixel values, for example 0-255 representing a gray-scale range of black (0) to white (255) or by color ranges, the ranges of which may depict uncertainties in whether a feature is present at the location represented by the pixel values. The scale and granularity of map 720 may be any such scale and dimensions as is suitable for the range and detail of the environment. For example, in the same embodiments of the present invention, each pixel in the map may represent 5 square centimeters (cm$^2$). In other embodiments each pixel may represent a range from 1 cm$^2$ to 5 cm$^2$. However, the spatial resolution of a map for use with the present invention may be larger or smaller without loss of generality or benefit to the application of its methods.

As depicted in FIG. 11, map 720 may be used by the robot to determine its location and orientation within the environment and to plan and control its movements along path 712,714,716, while avoiding obstacles (shown in black). Such maps may be "local maps", representing spatial features in the immediate vicinity of the robot or a target location, or "global maps", representing features of an area or facility encompassing the operating range of one or more robots. One or more robots may cooperatively map a shared environment, the resulting map further enhanced as the robots navigate, collect, and share information about the environment. Maps may be provided to a robot from a supervisory system or a robot may construct its map using onboard range finding and location sensors.

In some embodiments the supervisory system may comprise a central server performing supervision of a plurality of robots in a manufacturing warehouse or other facility, or the supervisory system may comprise a distributed supervisory system consisting of one or more servers operating within or without the facility either fully remotely or partially without loss of generality in the application of the methods and systems herein described. The supervisory system may include a server or servers having at least a computer processor and a memory for executing a supervisory system and may further include one or more transceivers for communicating information to one or more robots operating in the warehouse or other facility. Supervisory systems may be hosted on computer servers or may be hosted in the cloud and communicating with the local robots via a local transceiver configured to receive and transmit messages to and from the robots and the supervisory system over wired and/or wireless communications media including over the Internet.

One skilled in the art would recognize that robotic mapping for the purposes of the present invention could be performed using methods known in the art without loss of generality. Further discussion of methods for robotic mapping can be found in Sebastian Thrun, "Robotic Mapping: A Survey", Carnegie-Mellon University, CMU-CS-02-111, February, 2002, which is incorporated herein by reference.

Obstacle Avoidance

Figure 12:
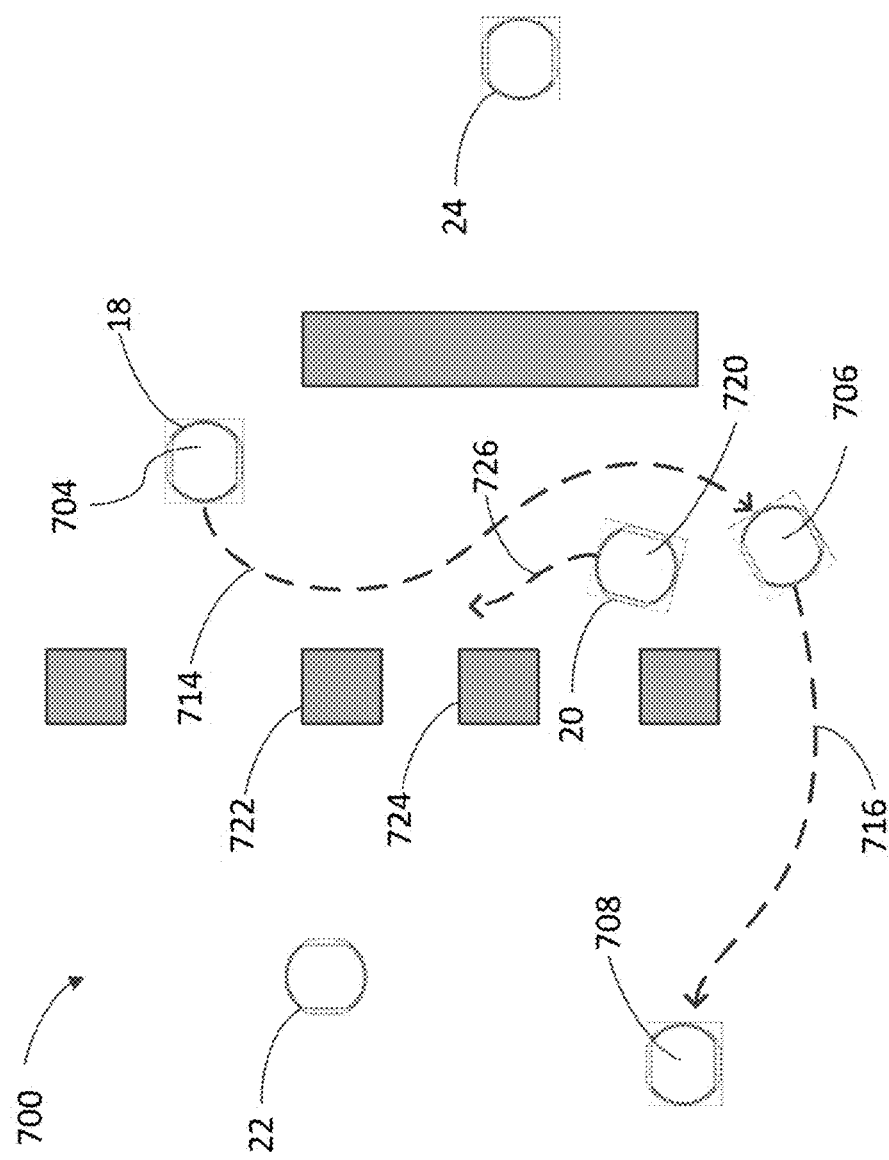
FIG. 12 depicts navigation and incremental movement of a robot navigating in proximity to obstacles and other robots.

To successfully navigate the goal path and arrive at the target product bin in the presence of dynamic obstacles, the robot must continually recalibrate its trajectory. At each recalibration, an instantaneous velocity is used to advance the robot one incremental movement along the goal path. For example, as shown in FIG. 12, robot 18 moves along path 714 (each dash in the line depicting an incremental movement, exaggerated) to target goal pose 708. Along path 714 robot encounters obstacles 722. Further along path 714, robot 18 encounters robot 20 which is moving along path 726 in proximity to obstacle 724. Avoiding obstacles 722 and 724 and avoiding collision with robot 20, robot 18 eventually reaches pose 706 and continues to goal pose 708 along path 716. Similarly, robot 20, also operating autonomously, avoids obstacle 724 and robot 18, navigating along path 726 along its goal path to the goal pose of robot 20 (not shown).

Incremental movement of the robot on a trajectory colliding with other robots may be prevented by methods such as optimal reciprocal collision avoidance (ORCA). ORCA guarantees that one robot will not collide with another by assuming that each robot is also computing its next incremental movement using ORCA. In this manner, robots may navigate fully autonomously while ensuring an optimal collision-free path for each. A discussion of ORCA is described in Jur van den Berg, Stephen J. Guy, Ming Lin, and Dinesh Manocha, "Reciprocal n-body collision avoidance", in Robotics Research: The 14th International Symposium ISRR, Cédric Pradalier, Roland Siegwart, and Gerhard Hirzinger (eds.), Springer Tracts in Advanced Robotics, Vol. 70, Springer-Verlag, May 2011, pp. 3-19, which is incorporated by reference herein.

Also known in the art of obstacle avoidance is the Dynamic Window Approach (DWA). DWA considers a set of N possible instantaneous velocities for incremental movement of the robot along the goal path. DWA then scores the trajectory taken by the robot assuming incremental movement according to each instantaneous velocity taken over one or more time steps. Each trajectory is scored according to an objective function that takes into account non-robot obstacles and other factors. For example, each trajectory may be scored according to adherence to the goal path weighed against avoiding close proximity to obstacles. By further example, adjusting the behavior of the robot in the presence of humans working among the robots may be desired. A discussion of DWA is provided in D. Fox, W. Burgard, and S. Thrun, "The Dynamic Window Approach to Collision Avoidance," in Robotics & Automation Magazine, IEEE, vol. 4, no. 1. (March 1997), pp. 23-33, which is incorporated by reference herein.

While DWA provides a flexible approach to controlling the behavior of the robot, it does so at the sacrifice of an optimal response when encountering ORCA-driven robots. Similarly, while ORCA provides a provably optimal and computationally efficient determination of the robot's next instantaneous velocity, ORCA does not account for non-robot obstacles and other factors important for optimizing the behavior of the robot as it navigates to the target location along the goal path.

ORCA/DWA

Figure 13:
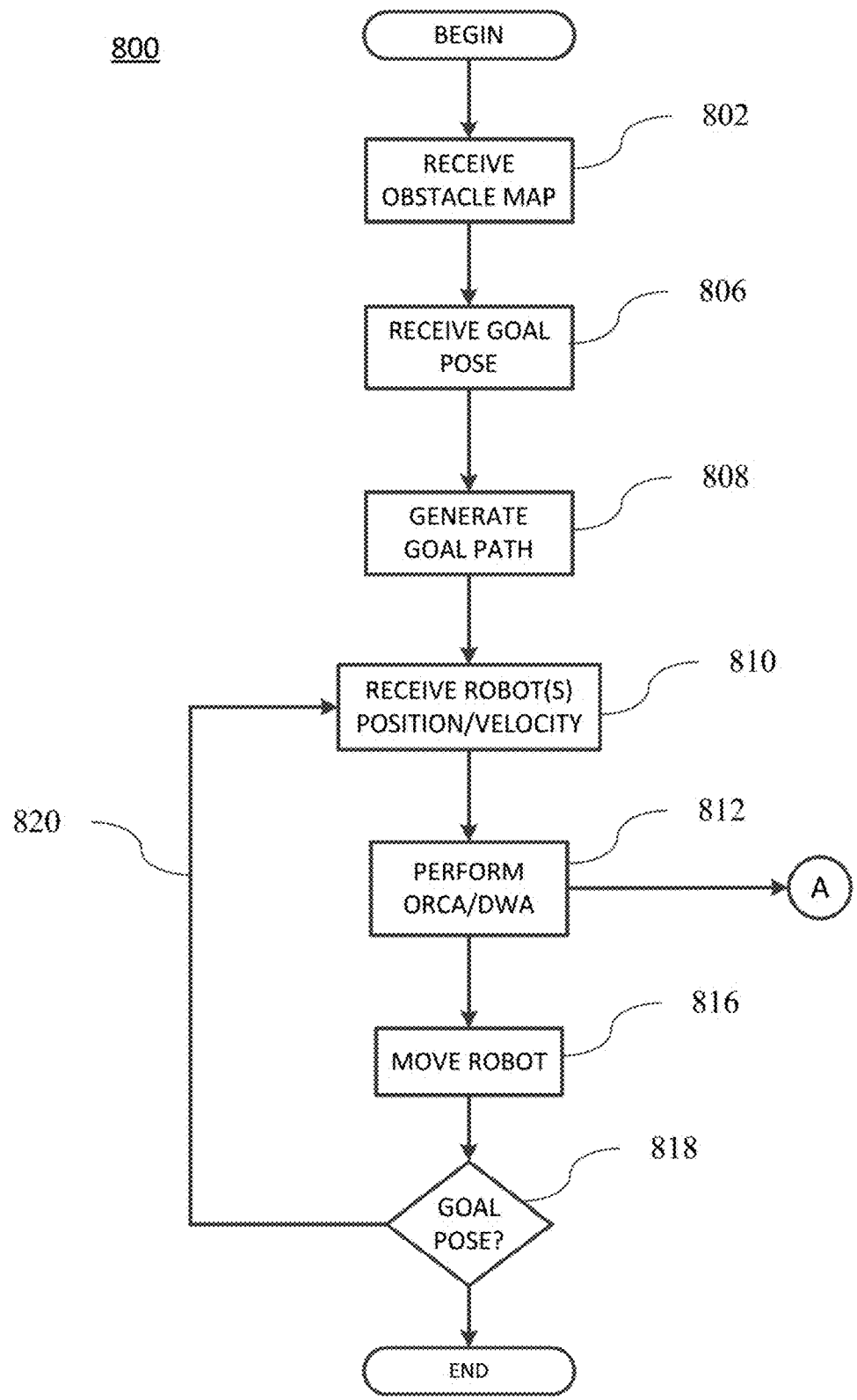
FIG. 13 is a flowchart illustrating an embodiment for navigating a robot along a goal path according to the present invention.

FIG. 13 illustrates an embodiment of the present invention as a method for moving the robot along the goal path to its target location or "goal pose". The flowchart is described with reference to robots 18, 20, 22, and 24 of FIG. 12, each of the robots comprising a robot system 600 as described above with reference to FIG. 9. The "other" robots may in some embodiments be implemented with variations on robot system 600, and some embodiments may include non-ORCA-driven robots wherein some other method of obstacle avoidance is employed without loss of generality to the application of the present invention to a system of robots having one or more robots using ORCA-based methods.

Beginning at step 802, robot system 600 receives an obstacle map via transceiver module 670, which may be stored in data storage 630. The obstacle map may be a SLAM map or other map, such as a cost map overlaid with obstacles. Alternatively, the obstacle map may be any spatial model capable of representing fixed obstacles within the robot environment. The obstacle map may be stored and subsequently retrieved from data storage 630 by data processor 620 or map processing module 646 or path planning module 642.

At step 806, robot system 600 receives a goal pose then generates, at step 808, the goal path to the target pose using path planning module 646. Path planning module 642 may generate the goal path from the current pose to the goal pose by a variety of techniques known to practitioners in the art including the A* and D* pathfinding algorithms. Alternatively, the robot may receive a goal path via transceiver module 670 or may retrieve a goal path from data storage 630. Having received the obstacle map and generated the goal path, robot system 600 then proceeds to move the robot incrementally along the goal path as follows.

At step 810, robot system 600 receives the current position and velocity of all robots in the area. Knowing the pose of all other robots relative to its pose, the robot can ignore robots far from its operating area. Alternatively, the robot may receive only the poses of robots operating in proximity to the robot without loss of generality of step 810. For example, referring again to FIG. 12, robot 18 at position 704 may receive the current position and velocity of robots 20, 22, and 24. Alternatively, robot 18 may receive the position and velocity of robot 20 only when in close proximity to pose 720, for example, or when approaching robot 20 near obstacle 724.

Additionally, in step 810, the robot receives its own pose. Preferably, the state of the robot, including its pose, may be determined by the robot system 600 using the odometry from the robot itself, the drive/train wheel encoders 664 and/or inertial sensor 668 or other sensor modules 660 or by processing modules 640 operating on other sensors or received information. The robot's pose may be determined by a fusion of the aforementioned inputs and/or by many-to-many multiresolution scan matching (M3RSM), adaptive monte-carlo localization (AMCL), geo-positioning satellite (GPS), fiducial information, or the robot's pose may be received from a supervisory system via transceiver 670.

At step 812, process 800 continues by performing ORCA/DWA, as particularly described below and in relation to FIG. 14, finding a next velocity to apply as the control for driving the next incremental movement of the robot along the goal path. At step 816 the robot moves incrementally along the goal path until reaching its goal pose. If at step 818 the goal pose is not reached, robot system 600 may repeat in the next time cycle (step 820), receiving the other robots' poses (step 810) as above, performing ORCA/DWA (step 812) and moving the robot (step 816) in the next time cycle until the goal pose (step 818) is reached. Following each incremental movement, the robot system 600 may determine its pose as above and transmit its current state, including its current pose, to a central server via transceiver 670. Each of robots 18, 20, 22, and 24 of FIG. 9 operating by the process 800 as herein described, makes all robots' poses available for the receiving by each other robot in the next time cycle.

Figure 14:
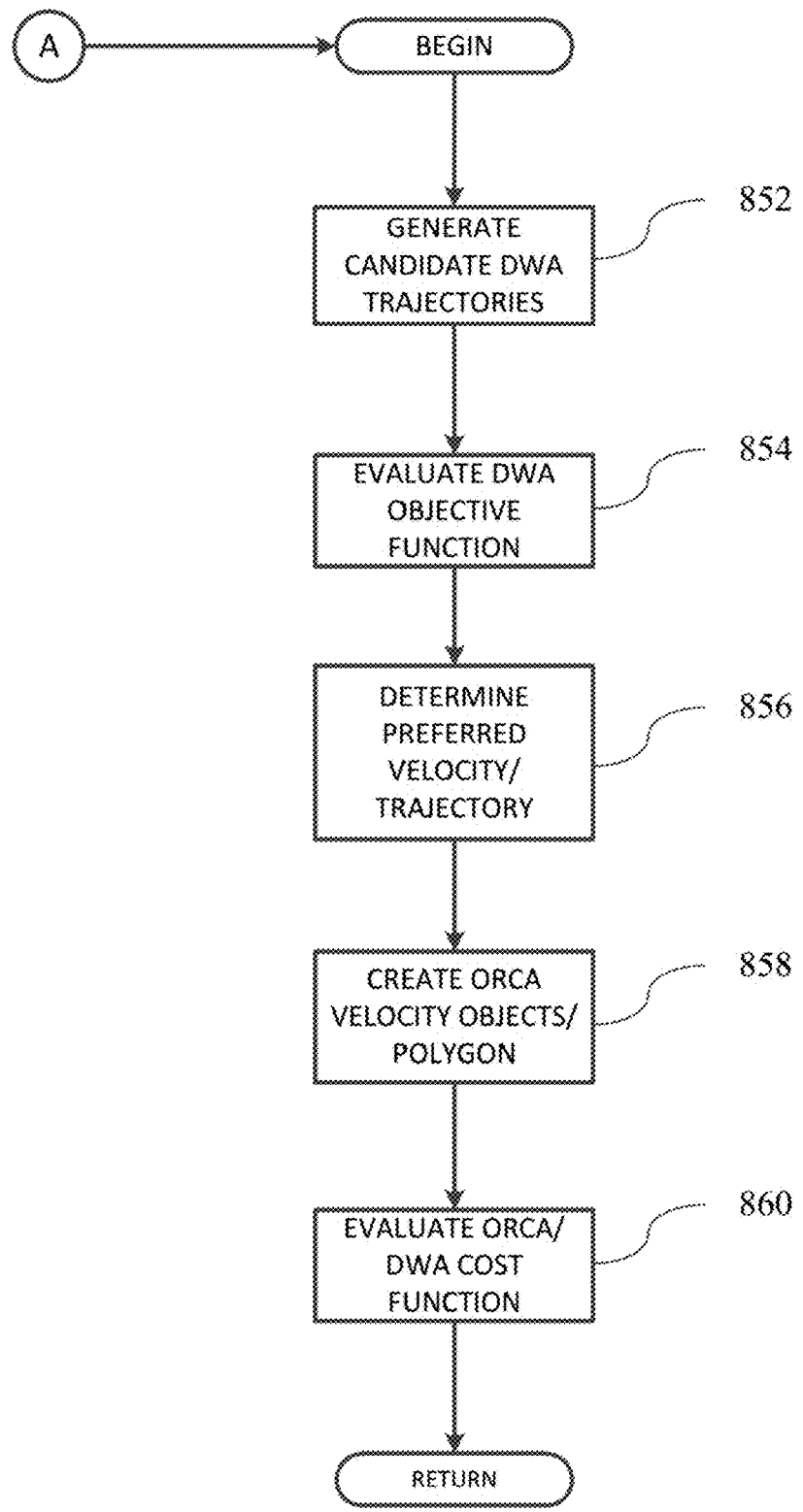
FIG. 14 is a flowchart illustrating an embodiment of performing ORCA/DWA according to the present invention.

FIG. 14 illustrates process A for performing ORCA/DWA (step 812 of FIG. 13) for determining an optimal velocity using a novel combination of the principles of obstacle avoidance algorithms DWA and ORCA as previously introduced.

Beginning at step 852, according to one embodiment, the set of possible or "candidate" velocities is generated according to DWA. The candidate velocities may be expressed as a set of trajectories or "curvatures" uniquely determined by velocity vector (v, ω), where v is the forward or linear motion of the robot and ω is the rotational velocity of the robot. The set of candidate velocities may be a finite set of velocities sampled from the set of possible trajectories advancing the robot from the robot's current pose, or the set of trajectories may define a curvature defined by the discrete, instantaneous movements of the robot advancing by a constant velocity (v, ω) over one or more next time intervals.

Thus, the method at step 812 generates the set of N possible instantaneous velocities for the robot to adopt as its control for the next movement at the next time step. By iterating over each of the candidate velocities, the method estimates the end pose of the robot, as if the robot were to proceed with the candidate velocity over the next T seconds at increments of t seconds. Without loss of generality and for the purposes of illustrating the present invention, T may be 1.5 seconds and time increment t may be 0.1 second. Thus, by way of example only, if the candidate velocity is 0.25 meters/sec of linear velocity and 0.785 rad/sec of rotational velocity, the process estimates the pose at which the robot would arrive, applying as its control velocity vector (v, ω)=(0.25, 0.785), at each of the 0.1, 0.2, 0.3 . . . 1.5 second time steps. The set of poses at each time step make up the trajectory to be scored by the ORCA/DWA objective functions to be further described below.

Discretization by DWA in generating the candidate velocities necessarily selects less than the infinite number of trajectories that a robot could move in the next succession of time steps. The set of candidate velocities may be further reduced by removing from the set those velocities whose curvatures would intersect with an obstacle in the next time interval or the next n time intervals, assuming the robot continued with a selected candidate velocity. By pruning the set of candidate velocities to non-obstacle colliding, admissible velocities, the search space for determining a preferred velocity is reduced. The set of candidate velocities may be further reduced by retaining only the admissible velocities. Admissible velocities may include only those velocities that would allow a robot to stop before colliding with an obstacle. Admissible velocities may include only those velocities within the dynamic window of the robot or within a maximum safe speed allowed for the robot. The dynamic window of the robot may include only velocities that can be reached within the next time interval given the limited acceleration of the robot. Alternatively, the set of candidate velocities may be generated or pruned by other methods, such as model predictive control (MPC) or other constraints-based algorithm.

Returning to FIG. 14, step 854, each candidate velocity (v, ω) in the set of candidate velocities is evaluated according to an objective function:

$$G(v,\omega)=\alpha^*\text{heading}(v,\omega)+\beta^*\text{dist}(v,\omega)+\gamma^*\text{velocity}(v,\omega),$$

where $G(v,\omega)$ is the objective function, $\alpha$, $\beta$, $\gamma$ are weights; heading$(v,\omega)$ is a measure of progress along the goal path; dist$(v,\omega)$ is the distance to the nearest obstacle (its "clearance"); and velocity$(v,\omega)$ is the forward velocity of the robot for a given candidate velocity $(v,\omega)$. A detailed discussion of the evaluation of an objective function $G(v,\omega)$ under DWA is found in D. Fox et al., "The Dynamic Window Approach to Collision Avoidance," as previously incorporated by reference above. One skilled in the art would understand variations on the objective function may be applied without loss of generality of the present invention.

Evaluating the objective function $G(v,\omega)$ for each of the candidate velocities determines a preferred velocity $v_{pref}$ by scoring each candidate velocity $(v,\omega)$ in the set of candidate velocities. Each candidate velocity $(v,\omega)$ is associated with a trajectory or curvature, as above. Preferably, objective function $G(v,\omega)$ is implemented as a cost function with weighted component functions representing one or more cost critics. In the cost critic embodiment, the preferred velocity $v_{pref}$ is the minimum $G(v,\omega)$ over the set of candidate velocities determined at step 856 of FIG. 14. Thus, as seen from the relationship of velocities to trajectories described above, the preferred trajectory $t_{pref}$ is the trajectory of the robot assuming $v_{pref}$ is applied at as a control to move the robot incrementally at velocity $v_{pref}$ over each of the next t seconds over a period of T seconds.

Cost critics in some embodiments may include a dist$(v,\omega)$ cost function that uses inflated obstacles in the obstacle map (e.g. inflated by the radius or diameter of the robot) to ensure that all robots get safely past static obstacles. Cost critics may include an oscillation cost function assigning higher costs to changes in the magnitude or direction of rotation. Cost critics may further include, in a preferred embodiment, a path cost critic weighting the distance of the robot from the goal path and/or how far along the goal path the robot would be for a given candidate velocity, or how much the candidate velocity would cause the robot to radiate from the goal path.

Preferred velocity $v_{pref}$ determined by applying the DWA objective function $G(v,\omega)$ is thus the minimum cost candidate velocity upon evaluation of all of the DWA cost critics. One skilled in the art would appreciate that weights $\alpha$, $\beta$, $\gamma$ for the cost functions of $G(v,\omega)$ above may be set according to preferences for the behavior of the robot. Each of the component functions of the objective function $G(v,\omega)$ may have its own weight or no weighting (weight=1). Preferably, one or more cost critics have "veto power" to invalidate a candidate velocity by adding a relatively high penalty value to any candidate velocity cost function score that violates pre-determined criteria.

Figure 15:
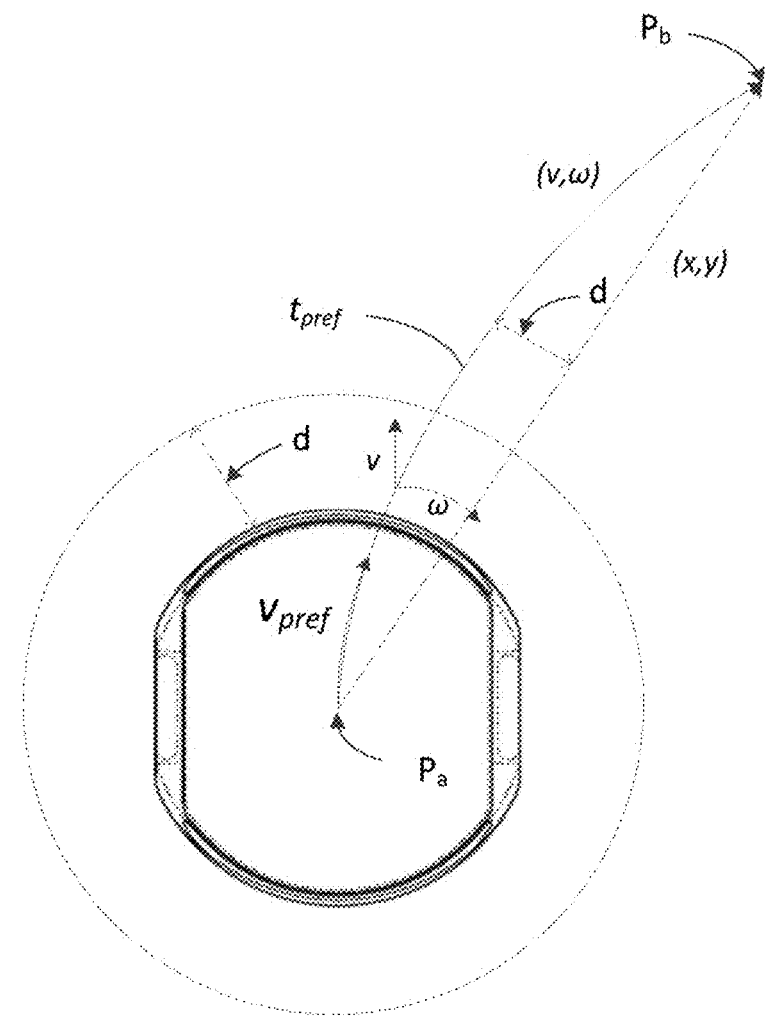
FIG. 15 illustrates an aspect of the invention for using DWA non-holonomic preferred velocity in the ORCA velocity object analysis.

As explained above, the preferred trajectory $t_{pref}$ determined by DWA at step 858 of FIG. 14 is a curvature defined by a velocity vector $(v,\omega)$ as applied to the robot control over successive time intervals. FIG. 15 illustrates this relationship between $v_{pref}$ and $t_{pref}$. As shown, the preferred velocity $v_{pref}$ for robot 18 at pose $P_a$ is the velocity vector $(v,\omega)$. The preferred trajectory $t_{pref}$ is the curvature defined by the path of the robot moved incrementally by $v_{pref}$. The velocity vector $(v,\omega)$ applied to the control of non-holonomic robots, such as found in differential drive (DD) robot propulsion systems, would thus move robot 18 along the curvature $P_a$-$P_b$.

Recalling that robot system 600 has already received, at step 810 of FIG. 13, the poses of the other robots, the process continues in step 858 by generating ORCA velocity objects (or "VOs"). According to known methods as referenced above, VOs are generated in relation to each other robot (e.g., 20, 22, 24) based on the preferred velocity $v_{pref}$ of robot 18. Here, for performing ORCA/DWA for robot 18, robot system 600 uses the preferred velocity $v_{pref}$ determined in step 856 for generating ORCA VOs.

ORCA, however, in at least one embodiment, requires preferred velocity $v_{pref}$ as an input and converts all velocities (v,ω) to holonomic velocities (x,y). That is, ORCA assumes that the robot can move in any direction (x,y). As one skilled in the art would understand, ORCA uses holonomic velocity vectors in its analysis, whereas $v_{pref}$ generated by DWA assumes non-holonomic robot control, as for differential drive robots. Thus, accommodation for some error must be made when converting the non-holonomic preferred velocity $v_{pref}$ to the holonomic vector (x, y) for use in generating ORCA VOs.

FIG. 15 illustrates this accommodation according to one aspect of the present invention. The correction for the use of non-holonomic velocity $v_{pref}$ in ORCA is accommodated by inflating the size of the other robots when generating each of their respective VOs. As illustrated in FIG. 15, the increase in the radius of each robot is made approximately equal to the maximum error distance d between the straight-line vector (x,y) and preferred trajectory $t_{pref}$. Inflating the other robots' radii by the maximum error d between the holonomic trajectory and the non-holonomic trajectory ensures collision-free movement of robot 18 in proximity to the other robots. One skilled in the art would understand that modifications of ORCA, including non-holonomic versions of ORCA, may be substituted with appropriate modification of the methods herein, e.g. ORCA-NH (non-holonomic) requires no accommodation in using the preferred trajectory as a non-holonomic velocity $v_{pref}$.

Figure 16A:
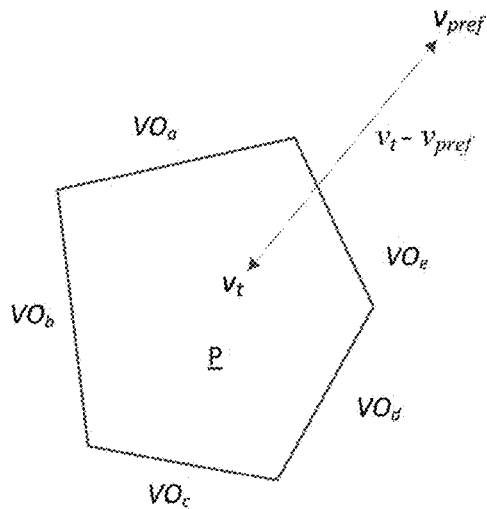
FIGS. 16A-C illustrate aspects of determining a distance and penalty cost function to apply to candidate velocities relative to the ORCA velocity space for use in the ORCA cost function.

As would be understood by one skilled in the art, creating the VOs and then taking the union of these VOs forms a polygon in velocity space defined by the intersection of the half-planes of each of the VOs. A discussion of creating VOs and taking their union in the application of ORCA is found in Jur van den Berg et al., "Reciprocal n-body collision avoidance", as previously incorporated by reference above. For example, FIG. 16A depicts the polygon P formed by the union of the half-planes of velocity objects $VO_a$-$VO_e$. Each of the VOs corresponds to other robots a-e whose poses are known to the robot to be moved in accordance with the methods herein described. Recalling that under ORCA, the polygon formed by the union of VOs defines collisions in velocity space (not pose space), any velocity for the robot that is within the polygon is considered safe and ensures collision free avoidance of the other robots; any velocity that falls outside of the polygon is not safe and may cause the robot to collide with one or more of the other robots.

With the above in mind, the process continues in FIG. 14 at step 860, evaluating the candidate velocities generated by DWA using a combined ORCA/DWA objective function. The combined ORCA/DWA objective function is comprised of a cost function $C_{DWA}$ combined with a cost critic $C_{ORCA}$, with weight $\alpha_{ORCA}$, as follows:

$$\text{ORCA/DWA} = C_{DWA} = \alpha_{ORCA} * C_{ORCA}$$

$C_{DWA}$ is defined as:

$$C_{DWA} = \alpha * \text{heading}(v,\omega) + \beta * \text{dist}(v,\omega) + \gamma * \text{velocity}(v,\omega),$$

where α, β, γ are weights; heading(v,ω) is a measure of progress along the goal path; dist(v,ω) is the distance to the nearest obstacle; and velocity(v,ω) is the forward velocity of the robot for a given candidate velocity (v,ω). $C_{DWA}$ and G(v,ω), as used above for determining $v_{pref}$ for ORCA VOs generation, may be implemented as the same function, with the same weights or as different functions with different weights or by combinations of other cost functions without loss of generality in application to the present invention.

$C_{ORCA}$ is defined as follows:

$$C_{ORCA} = \alpha_v(v_t - v_{pref}) + \text{penalty} + \alpha_d * d(P, v_t)$$

where $\alpha_d$ and $\alpha_v$ are weights; $v_t$ is a candidate velocity being evaluated; $v_{pref}$ is the preferred velocity; P is the polygon formed by the union of VOs; d (P, $v_t$) is a measure of how much a candidate velocity violates the VOs; and penalty is a penalty cost imposed when a candidate velocity $v_t$ violates a VO.

Figure 16B:
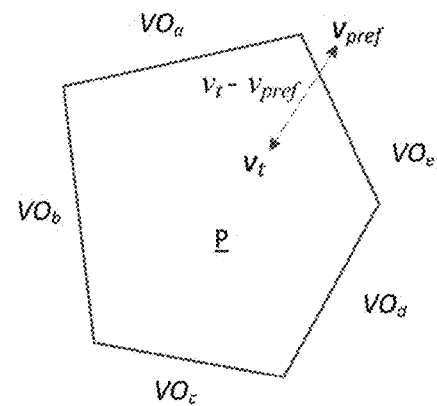

In the evaluation of cost critic $C_{ORCA}$, all candidate velocities $v_t$ get a base cost $\alpha_v$ ($v_t$-$v_{pref}$) as a measure of how much they differ from the preferred velocity $v_{pref}$. For example, as depicted in FIG. 16A, if candidate velocity $v_t$ is inside the polygon P formed of the VOs, but the distance from $v_t$ to $v_{pref}$ is large, the cost $\alpha_v(v_t$-$v_{pref})$ is large but no penalty is added. If as shown in FIG. 16B candidate velocity $v_t$ is inside the polygon P and the distance to $v_{pref}$ is small, cost $\alpha_v$ ($v_t$-$v_{pref}$) is small and again no penalty is added. However, where candidate velocity $v_t$ violates at least one velocity obstacle (i.e. it is outside polygon P and therefore "unsafe") a penalty is added to the base cost term $\alpha_v$ ($v_t$-$v_{pref}$)+penalty.

Figure 16C:
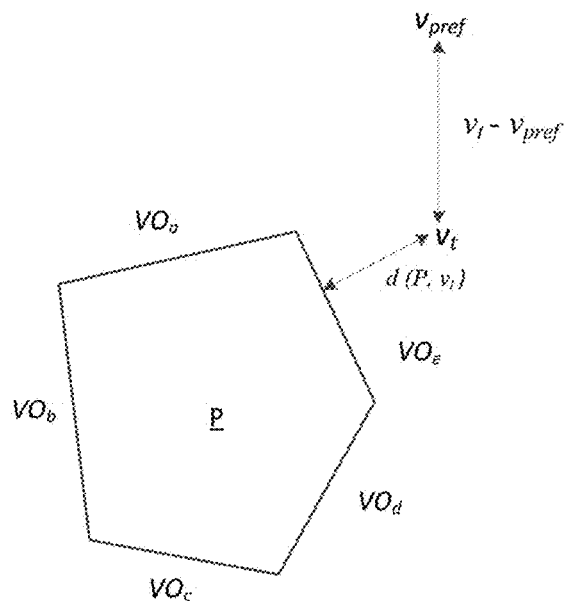

Further, in a preferred embodiment, an additional penalty may be imposed on $v_t$ based on the distance d (P, $v_t$) from $v_t$ to the edge of polygon P. For example, shown in FIG. 16C, cost function d (P, $v_t$) is a function of the minimum distance from the perimeter of polygon P to a point defined by the trajectory t reached by candidate velocity $v_t$. In the example shown, $v_t$ is both outside polygon P, incurring a first penalty, and relatively far from $v_{pref}$, incurring still higher cost $\alpha_v$ ($v_t$-$v_{pref}$), and further incurs an additional penalty based on the magnitude of the violation; that is, the distance from $v_t$ to polygon P. Thus, in the evaluation of $C_{ORCA}$ for this example, $\alpha_v$ ($v_t$-$v_{pref}$)+penalty+penalty*d (P, $v_t$) exacts a high cost on $v_t$ when added into the combined ORCA/DWA objective function.

Combining the ORCA and DWA cost critics and taking the minimum weighed cost:

$$\min(C_{DWA} + \alpha_{ORCA} * C_{ORCA})$$

returns the optimal candidate velocity from the set of candidate velocities. Returning to step 816 of FIG. 13, the next control is the instantaneous velocity associated with the candidate velocity having the minimum cost as determined by the combined ORCA/DWA cost function. Applying the control to the robot drive control, the robot moves incrementally along the goal path (step 818) and the process repeats (step 820) until the robot reaches its goal pose.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto.

It should be understood that the present invention may be implemented with software and/or hardware. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." As will be appreciated by one skilled in the art, aspects of the invention may be embodied as a system, method or computer program product.

Aspects of the present invention are described with reference to flowcharts, illustrations and/or block diagrams of methods and apparatus (systems). The flowcharts and block diagrams may illustrate system architecture, functionality, or operations according to various embodiments of the invention. Each step in the flowchart may represent a module, which comprises one or more executable instructions for implementing the specified function(s). In some implementations, steps shown in succession may in fact be executed substantially concurrently. Steps may be performed by special purpose hardware-based systems that perform the specified functions or acts, or combinations of special purpose hardware and computer instructions.

Computer instructions for execution by a processor carrying out operations of the present invention may be written one or more programming languages, including object-oriented programming languages such as C#, C++, Python, or Java programming languages. Computer program instructions may be stored on a computer readable medium that can direct the robot system via the data processor to function in a particular manner, including executing instructions which implement the steps specified in a flowchart and/or system block diagram described herein. A computer readable storage medium may be any tangible medium that can contain, or store instructions for use by or in connection with the data processor. A computer readable medium may also include a propagated data signal with computer readable program code embodied therein.

The invention is therefore not limited by the above described embodiments and examples, embodiments, and applications within the scope and spirit of the invention claimed as follows.

We claim:

1. A method for navigation of a robot along a goal path and avoiding obstacles, comprising:
   receiving a goal pose for a first robot;
   determining a goal path for the first robot;
   receiving an obstacle map;
   receiving the pose of the first robot;
   receiving the pose of one or more other robots;
   generating a set of candidate velocities for the first robot;
   evaluating, using a first objective function, the first set of candidate velocities;
   selecting, based on the first objective function, a first preferred velocity of the first robot;
   creating a set of velocity obstacles based on the pose(s) of the one or more other robots and the first preferred velocity of the first robot;
   evaluating, using a second objective function, the set of candidate velocities;
   selecting, based on the second objective function, a second preferred velocity for the first robot; and
   moving the first robot based on the second preferred velocity.

2. The method of claim 1, wherein the goal path comprises a path from a current pose of the first robot to the goal pose of the first robot.

3. The method of claim 1, wherein goal pose of the robot is the pose of a fiducial associated product bin in an order fulfillment warehouse application.

4. The method of claim 1, wherein the pose of the first robot is determined by one or more of many-to-many multiresolution scan matching (M3RSM), adaptive monte carlo localization (AMCL), geo-positioning satellite (GPS), fiducial information, and odometry-based on robot sensors.

5. The method of claim 1, wherein generating the set of candidate velocities for the first robot assumes a candidate velocity over one or more time steps applying motion, obstacle, and inertial constraints to generate only candidate velocities having admissible trajectories.

6. The method of claim 1, wherein the first objective function is comprised of one or more cost functions of the form:

$$G(v,\omega)=\alpha*\text{heading}(v,\omega)+\beta*\text{dist}(v,\omega)+\gamma*\text{velocity}(v,\omega),$$

where $G(v,\omega)$ is the objective function, $\alpha$, $\beta$, $\gamma$ are weights; heading$(v,\omega)$ is a measure of progress along the goal path; dist$(v,\omega)$ is the distance to the nearest obstacle (its "clearance"); and velocity$(v,\omega)$ is the forward velocity of the robot for a given candidate velocity $(v,\omega)$.

7. The method of claim 5, wherein the first objective function further includes one or more of:
   a path cost function which scores how much the candidate velocity would radiate from the goal path;
   an obstacle cost function scoring proximity to obstacles; and
   an oscillation cost function assigning higher costs to changes in rotational velocity from a previous preferred velocity.

8. The method of claim 5, wherein the one or more cost functions invalidate a candidate velocity by assigning a highest cost score to the candidate velocity.

9. The method of claim 1, wherein creating the set of velocity objects includes converting the preferred velocity from a non-holonomic to a holonomic velocity.

10. The method of claim 8, wherein converting the preferred velocity to a holonomic velocity includes increasing the radius of the one or more other robots by a maximum distance between a preferred trajectory and a straight-line trajectory.

11. The method of claim 1, wherein the second objective function is comprised of one or more cost functions of the form:

$$\text{ORCA/DWA}=C_{DWA}+\alpha_{ORCA}*C_{ORCA}$$

where $C_{DWA}$ is defined as:

$$C_{DWA}=a*\text{heading}(v,\omega)+\beta*\text{dist}(v,\omega)+\gamma*\text{velocity}(v,\omega),$$

where $\alpha$, $\beta$, $\gamma$ are weights; heading$(v,\omega)$ is a measure of progress along the goal path; dist$(v,\omega)$ is the distance to the nearest obstacle; and velocity$(v,\omega)$ is the forward velocity of the robot for a given candidate velocity $(v,\omega)$; and $C_{ORCA}$ is defined as:

$$C_{ORCA}=\alpha_v(v_t-v_{pref})+\text{penalty}+\alpha_d*d(P,v_t)$$

where $\alpha_d$ and $\alpha_v$ are weights; $v_t$ is a candidate velocity being evaluated; $v_{pref}$ is the preferred velocity; P is the polygon formed by the union of VOs; $d(P, v_t)$ is a measure of how much a candidate velocity violates the VOs; and penalty is a penalty cost imposed when a candidate velocity $v_t$ violates a VO.

12. The method of claim 10, wherein cost function d (P, $v_t$) is a function of the minimum distance from the perimeter of polygon P to a point defined by the trajectory t reached by candidate velocity yr.

13. A robot system for navigation of a robot along a goal path and avoiding obstacles, comprising:
a transceiver;
a data storage device;
a data processor configured to retrieve instructions stored on the data storage device for execution by the data processor to:
receive a goal pose for a first robot;
determine a goal path for the first robot;
receive an obstacle map;
receive the pose of the first robot;
receive the pose of one or more other robots;
generate a set of candidate velocities for the first robot;
evaluate, using a first objective function, the first set of candidate velocities;
select, based on the first objective function, a first preferred velocity of the first robot;
create a set of velocity obstacles based on the pose(s) of the one or more other robots and the first preferred velocity of the first robot;
evaluate, using a second objective function, the set of candidate velocities;
select, based on the second objective function, a second preferred velocity for the first robot; and
move the first robot based on the second preferred velocity.

14. The system of claim 13, wherein the goal path comprises a path from a current pose of the first robot to the goal pose of the first robot.

15. The system of claim 13, wherein goal pose of the robot is the pose of a fiducial associated product bin in an order fulfillment warehouse application.

16. The system of claim 13, wherein the pose of the first robot is determined by one or more of many-to-many multiresolution scan matching (M3RSM), adaptive monte carlo localization (AMCL), geo-positioning satellite (GPS), fiducial information, and odometry-based on robot sensors.

17. The system of claim 13, wherein generating the set of candidate velocities for the first robot assumes a candidate velocity over one or more time steps applying motion, obstacle, and inertial constraints to generate only candidate velocities having admissible trajectories.

18. The system of claim 13, wherein the first objective function is comprised of one or more cost functions of the form:

$$G(v,\omega)=\alpha*\text{heading}(v,\omega)+\beta*\text{dist}(v,\omega)+\gamma*\text{velocity}(v,\omega),$$

where $G(v,\omega)$ is the objective function, $\alpha$, $\beta$, $\gamma$ are weights; heading$(v,\omega)$ is a measure of progress along the goal path; dist$(v,\omega)$ is the distance to the nearest obstacle (its "clearance"); and velocity$(v,\omega)$ is the forward velocity of the robot for a given candidate velocity $(v,\omega)$.

19. The system of claim 17, wherein the first objective function further includes one or more of:
a path cost function which scores how much the candidate velocity would radiate from the goal path;
an obstacle cost function scoring proximity to obstacles; and
an oscillation cost function assigning higher costs to changes in rotational velocity from a previous preferred velocity.

20. The system of claim 17, wherein the one or more cost functions invalidate a candidate velocity by assigning a highest cost score to the candidate velocity.

21. The system of claim 13, wherein creating the set of velocity objects includes converting the preferred velocity from a non-holonomic to a holonomic velocity.

22. The system of claim 20, wherein converting the preferred velocity to a holonomic velocity includes increasing the radius of the one or more robots by a maximum distance between a preferred trajectory and a straight-line trajectory.

23. The system of claim 13, wherein the second objective function is comprised of one or more cost functions of the form:

$$\text{ORCA/DWA}=C_{DWA}+\alpha_{ORCA}*C_{ORCA}$$

where $C_{DWA}$ is defined as:

$$C_{DWA}=\alpha*\text{heading}(v,\omega)+\beta*\text{dist}(v,\omega)+\gamma*\text{velocity}(v,\omega),$$

where $\alpha$, $\beta$, $\gamma$ are weights; heading$(v,\omega)$ is a measure of progress along the goal path; dist$(v,\omega)$ is the distance to the nearest obstacle; and velocity$(v,\omega)$ is the forward velocity of the robot for a given candidate velocity $(v,\omega)$; and $C_{ORCA}$ is defined as:

$$C_{ORCA}=\alpha_v(v_t-v_{pref})+\text{penalty}+\alpha_d*d(P,v_t)$$

where $\alpha_d$ and $\alpha_v$ are weights; $v_t$ is a candidate velocity being evaluated; $v_{pref}$ is the preferred velocity; P is the polygon formed by the union of VOs; d (P, $v_t$) is a measure of how much a candidate velocity violates the VOs; and penalty is a penalty cost imposed when a candidate velocity $v_t$ violates a VO.

24. The method of claim 22, wherein cost function d (P, $v_t$) is a function of the minimum distance from the perimeter of polygon P to a point defined by the trajectory t reached by candidate velocity $v_t$.

25. A system, comprising a plurality of robots and a supervisory system wherein one or more robots under the supervision of the supervisory system perform the method of claim 1.

* * * * *